United States Patent [19]
Moody

[11] Patent Number: 5,966,533
[45] Date of Patent: Oct. 12, 1999

[54] METHOD AND SYSTEM FOR DYNAMICALLY SYNTHESIZING A COMPUTER PROGRAM BY DIFFERENTIALLY RESOLVING ATOMS BASED ON USER CONTEXT DATA

[75] Inventor: Scott F. Moody, Seattle, Wash.

[73] Assignee: Excite, Inc., Redwood City, Calif.

[21] Appl. No.: 08/661,549

[22] Filed: Jun. 11, 1996

[51] Int. Cl.$^6$ .............................. G06F 9/44; G06F 17/30
[52] U.S. Cl. .............................. 395/702; 395/701; 707/3; 707/103; 707/104; 707/10; 709/203; 706/47; 706/45; 706/922; 706/934; 345/335; 345/333; 345/968; 345/961
[58] Field of Search ..................................... 395/702, 701, 395/500, 683, 682; 345/333, 335, 337, 338, 340, 347, 348, 352, 961–968; 707/1, 3, 6, 100–104, 516, 514, 10; 709/303–305, 201–204, 206, 217; 706/48, 47, 45, 55, 919, 922, 934; 705/26

[56] References Cited

U.S. PATENT DOCUMENTS

| | | | |
|---|---|---|---|
| 5,115,501 | 5/1992 | Kerr | 707/9 |
| 5,287,514 | 2/1994 | Gram | 345/333 |
| 5,499,335 | 3/1996 | Silver et al. | 395/161 |
| 5,535,323 | 7/1996 | Miller et al. | 345/338 |
| 5,603,034 | 2/1997 | Swanson | 395/701 |
| 5,625,783 | 4/1997 | Ezekiel et al. | 395/352 |
| 5,680,617 | 10/1997 | Gough et al. | 707/104 |
| 5,689,708 | 11/1997 | Regnier et al. | 395/682 |
| 5,699,310 | 12/1997 | Garloff et al. | 395/701 |
| 5,760,768 | 6/1998 | Gram | 345/333 |
| 5,774,118 | 6/1998 | Hantakama | 345/337 |

*Primary Examiner*—James P. Trammell
*Assistant Examiner*—Tuan Q. Dam
*Attorney, Agent, or Firm*—Fenwick & West LLP

[57] ABSTRACT

A method and system for dynamically synthesizing a computer program based on user context data is provided. In accordance with the invention, a request is received to generate a computer program for an identified user. In response, an incomplete definition of the computer program, from which portions of the definition are omitted, is retrieved. For each portion of the computer program omitted from the incomplete definition of the computer program, a plurality of possible versions of the omitted portion are accessed. Each possible version produces a different behavior in the computer program when it is added to the computer program. Further, each possible version has one or more conditions that may be evaluated against user attributes for the identified user to determine whether the possible version is acceptable for the user. Next, for each possible version of each omitted portion, the conditions of the possible version are evaluated to determine whether the possible version is acceptable for the user. A preference rule is then used to select, for each omitted portion, one possible version determined to be acceptable. Finally, the versions of the omitted portions of the computer program selected as preferred are added to the incomplete definition of the computer program in order to complete the definition of the computer program. In a further preferred embodiment of the present invention, the completed computer program is executed on behalf of the identified user.

11 Claims, 22 Drawing Sheets application atom table — 910

| atom i.d. | condition group i.d. | resolution type | data |
|---|---|---|---|
| drawing application | 0 | program | A |
| drawing tracker | 932 | ascii text | B |
| drawing tracker | 337 | ascii text | C |
| drawing tracker | 0 | ascii text | D |
| seasonal feet | 268 | gif | E |
| seasonal feet | 701 | gif | F | application condition group table — 915

| condition group i.d. | category | comparator | compare value |
|---|---|---|---|
| 932 | occupation | is kind of | engineer |
| 337 | age group | is kind of | child |
| 268 | age group | is kind of | child |
| 268 | season | = | summer |
| 701 | age group | is kind of | child |
| 701 | season | = | winter | sponsor atom table — 920

| atom i.d. | condition group i.d. | resolution type | data |
|---|---|---|---|
| seasonal feet | 268 | gif | G |
| seasonal feet | 701 | gif | H | sponsor condition group table — 925

| condition group i.d. | category | comparator | compare value |
|---|---|---|---|
| | | | |
| | | | |
| | | | | user atom table — 930

| atom i.d. | condition group i.d. | resolution type | data |
|---|---|---|---|
| | | | |
| | | | | user condition group table — 935

| condition group i.d. | category | comparator | compare value |
|---|---|---|---|
| | | | |
| | | | |

*FIG. 9A* atom accessor table — 1101

| atom type | atom accessor i.d. |
|---|---|
| ascii text | 401 |
| program | 401 |
| gif | 0 |

FIG. 11 ascii text, program accessor ⟋─1202

(401):

Embedded Types()
{return(ascii text, ebcdic text, html, WordPerfect)
}

Next Contained Atom (container text)
{       find first open delimiter in container text
        find first close delimiter following first open delimiter
                in container text
        return (text in container text between found
                open and close delimiters)
}

Replace Contained Atom   (container text,
                          contained atom type,
                          contained atom resolution data)
{       remove open delimiter through close delimiter
                from container text
        switch (contained atom type)
                ascii text:    {}
                ebcdic text:   {convert contained atom resolution
                                        data from ebcdic to ascii}
                html:          {delete html tags from contained atom
                                        resolution data}
                WordPerfect:{delete formatting data from contained
                                        atom resolution data
                                insert contained atom resolution data
                                        in container text}
        insert contained atom resolution data in container text
}

*FIG. 12*

METHOD AND SYSTEM FOR DYNAMICALLY SYNTHESIZING A COMPUTER PROGRAM BY DIFFERENTIALLY RESOLVING ATOMS BASED ON USER CONTEXT DATA

TECHNICAL FIELD

The invention relates generally to the field of providing computer programs, and, more specifically, to the field of dynamically synthesizing computer programs based on user context data.

BACKGROUND OF THE INVENTION

Computer users utilize a variety of application programs for many different purposes, which include producing documents, art, and music; communicating; learning and researching; transacting business; and pursuing recreation. Such application programs are carefully designed to be useful to and usable for what their designers anticipate to be the application programs' typical users. The broad, multi-dimensional diversity of modern computer users however, makes it increasingly difficult to identify and design application programs for typical users. The diversity of modem users further ensures that many users will diverge significantly from any users identified as typical. As a result, many conventional applications are ill-suited to many of their users, not to mention their potential users.

Some conventional application programs may be tailored, in certain limited senses, to a particular user. First, some conventional application programs utilize different data resources depending on the value of a variable which may be said to be associated with a user. For instance, some programs display a text string in different languages based on the value of a current language variable. As another example, some programs display different times based on the value of a current time zone variable. This approach to tailoring application programs to a user does not affect how a program functions, but rather just which data it presents in a given situation.

Second, some conventional application programs permit a user to set run-time options that specify whether the application program provides certain optional features. For example, some application programs for drawing permit their users to select whether the application program should provide the feature of displaying a grid of lines intended to help the user to align portions of a drawing. This approach to tailoring application programs relies on an explicit command from the user to provide the feature or not provide the feature, which can make tailoring the performance of an application in this way time consuming and frustrating for users, often involving significant trial and error.

Given the limits of conventional approaches to tailoring application programs to particular users, a flexible and extensible system for dynamically generating computer programs and portions thereof, including various types of data artifacts, based upon relevant user information would have significant utility.

SUMMARY OF THE INVENTION

The present invention provides a software facility for dynamically synthesizing an application that is customized for the user of the application based on characteristics, or "attributes," of the user in response to a request to execute the application. As an example, the context data for each user may be the user's age group and occupation. When a particular user requests to execute the application, the facility uses the requesting user's characteristics to determine which behaviors the application should exhibit for the requesting user. An example of such an application is a drawing program that allows the user to rearrange the contents of a drawing in various ways. For a user whose age group is "child," the facility preferably determines that the drawing application should exhibit a fun dragging behavior in which an object dragged from one location in the drawing to another is drawn with feet while it is being dragged. On the other hand, for a user whose occupation is "engineer," the facility preferably determines that the drawing application should exhibit a precise dragging behavior in which the dragged object may only be dragged to certain discrete points in the drawing. Behaviors may be defined by the designer of the application at any level of granularity that is appropriate for the application. When the facility determines which behaviors the application should exhibit based on the user's characteristics, it inserts code for performing these behaviors into the application. The facility then executes the application for the requesting user, which performs the behaviors determined to be appropriate for the requesting user.

The facility uses an "atom server" to synthesize an application based on the user's characteristics. The atom server is a computer program that receives an identification of an atom and selects an implementation of that atom that is appropriate to the user's characteristics. An atom can be any programming concept (e.g., an application, a bitmap, etc.) that can have various different implementations. Selecting an implementation of an atom is referred to as "resolving" the atom and the implementations are referred to as "resolutions" of the atom. A single atom may have resolutions of different types. For example, an atom representing an application may have resolutions that are interpreted versions of the application and other resolutions that are compiled versions of the application. Atoms may also resolve to a data artifact, such as a string of text, an image, or an audio clip instead of an application. A developer of an atom that can be synthesized by the atom server provides the various implementations to the atom server along with a description of the user characteristics for which the atom is to be resolved to each different implementation.

An atom client is a computer program that passes to the atom server an atom identifier that identifies an atom to be resolved and a context identifier that identifies context data ("context") to use to resolve the atom. In a preferred embodiment, each context corresponds to a user of the atom client, which enables the atom server to return different resolutions of the same atom for different users. A user context is preferably made up of several subcontexts, including an individual subcontext containing information specific for the user, group subcontexts containing information specific to members of particular groups of users, and a general subcontext containing information pertaining to all users. The atom server processes an atom resolution request by first selecting resolutions of the requested atom stored in an atom table. The atom table contains an entry for each resolution of each atom. Each atom table entry contains an atom identifier, an indication of the resolution of the identified atom having the atom identifier, and one or more conditions specifying contexts for which the resolution is appropriate. The atom server initially identifies each resolution as the requested atom. The atom server then discards resolutions whose conditions are not completely satisfied. The atom server then applies selection rules to select one of the appropriate resolutions that best suits the identified context. The selected resolution may contain embedded references to other atoms. If so, the atom server resolves these "embedded atoms" in the same manner as the requested atom using the context specified in the request. After it has resolved any embedded atoms, the atom server returns the selected resolution of the requested atom to the atom client as the resolved atom. The atom client then preferably presents the resolved atom to the user. If the resolved atom is a program, the atom client preferably executes it. If the resolved atom is a data artifact, the atom client preferably displays or plays it, as appropriate.

BRIEF DESCRIPTION OF THE DRAWINGS

FIGS. 9A–C together comprise a table diagram showing sample atom tables.

FIG. 11 is a table diagram showing a sample atom accessor table.

FIG. 12 is a diagram showing a sample atom accessor for accessing ascii text atoms.

DETAILED DESCRIPTION OF THE INVENTION

Figure 1:
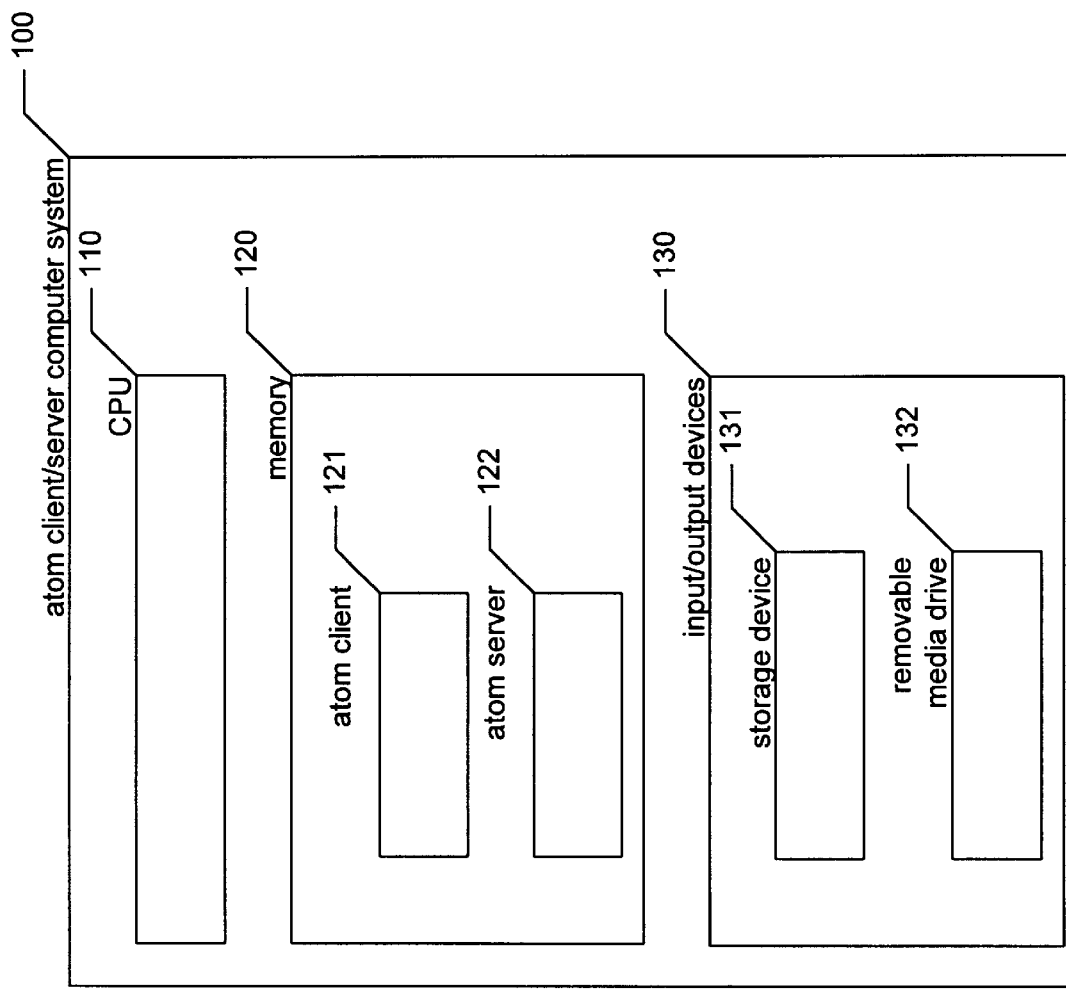
FIG. 1 is a system diagram showing a single computer system upon which the atom client and atom server may both execute.

The present invention provides a software facility for dynamically synthesizing an application that is customized for the user of the application based on characteristics, or "attributes," of the user in response to a request to execute the application. As an example, the characteristics for each user may be the user's age group and occupation. When a particular user requests to execute the application, the facility uses the requesting user's characteristics to determine which behaviors the application should exhibit for the requesting user. An example of such an application is a drawing program that allows the user to rearrange the contents of a drawing in various ways. For a user whose age group is "child," the facility preferably determines that the drawing application should exhibit a fan dragging behavior in which an object dragged from one location in the drawing to another is drawn with feet while it is being dragged. On the other hand, for a user whose occupation is "engineer," the facility preferably determines that the drawing application should exhibit a precise dragging behavior in which the dragged object may only be dragged to certain discrete points in the drawing. Behaviors may be defined by the designer of the application at any level of granularity that is appropriate for the application. When the facility determines which behaviors the application should exhibit based on the user's characteristics, it inserts code for performing these behaviors into the application. The facility then executes the application for the requesting user, which performs the behaviors determined to be appropriate for the requesting user.

The facility uses an "atom server" to synthesize an application based on the user's characteristics. The atom server is a computer program that receives an identification of an atom and selects an implementation of that atom that is appropriate to the user's characteristics. An atom can be any programming concept (e.g., an application, a bitmap, etc.) that can have various different implementations. Selecting an implementation of an atom is referred to as "resolving" the atom and the implementations are referred to as "resolutions" of the atom. A single atom may have resolutions of different types. For example, an atom representing an application may have resolutions that are interpreted versions of the application and other resolutions that are compiled versions of the application. Atoms may also resolve to a data artifact, such as a string of text, an image, or an audio clip instead of an application. A developer of an atom that can be synthesized by the atom server provides the various implementations to the atom server along with a description of the user characteristics for which the atom is to be resolved to each different implementation.

An atom client is a computer program that passes to the atom server an atom identifier that identifies an atom to be resolved and a context identifier that identifies context data ("context") to use to resolve the atom. The context data is made up of the characteristics of the user for whom the atom is to be resolved. In a preferred embodiment, each context corresponds to a user of the atom client, which enables the atom server to return different resolutions of the same atom for different users. A user context is preferably made up of several subcontexts, including an individual subcontext containing information specific to the user, group subcontexts containing information specific to members of particular groups of users, and a general subcontext containing information pertaining to all users. The atom server processes an atom resolution request by first selecting resolutions of the requested atom stored in an atom table. The atom table contains an entry for each resolution of each atom. Each atom table entry contains an atom identifier, an indication of the resolution of the identified atom having the atom identifier, and one or more conditions specifying contexts for which the resolution is appropriate. The atom server initially identifies each resolution as the requested atom. The atom server then discards resolutions whose conditions are not completely satisfied. The atom server then applies selection rules to select one of the appropriate resolutions that best suits the identified context. The selected resolution may contain embedded references to other atoms. If so, the atom server resolves these "embedded atoms" in the same manner as the requested atom using the context specified in the request. After it has resolved any embedded atoms, the atom server returns the selected resolution of the requested atom to the atom client as the resolved atom. The atom client then preferably presents the resolved atom to the user. If the resolved atom is a program, the atom client preferably executes it. If the resolved atom is a data artifact, the atom client preferably displays or plays it, as appropriate.

The atom client and atom server may preferably execute on the same computer system or on different, connected computer systems. FIG. 1 is a system diagram showing a single computer system upon which the atom client and atom server may both execute. A single atom client/atom server computer system 100 contains a central processing unit (CPU) 110, a memory 120, and input/output devices 130. The memory preferably contains the atom client 121 and the atom server 122. The atom client preferably includes code for requesting atoms and presenting them to a user as is described in detail below. The atom server preferably includes code for resolving atoms in response to requests from the atom client, as well as the data used to resolve atoms, such as atom tables and context tables. During the atom resolution process, portions of the atom server and atom client not immediately needed may be removed from memory in order to minimize the amount of memory consumed. The input/output devices preferably include a nonvolatile storage device 131, such as a hard disk drive, and a removable media drive 132, which can be used to install software products, including the atom server and atom client, which are provided on a computer-readable medium, such as a floppy or a CD-ROM.

Figure 2:
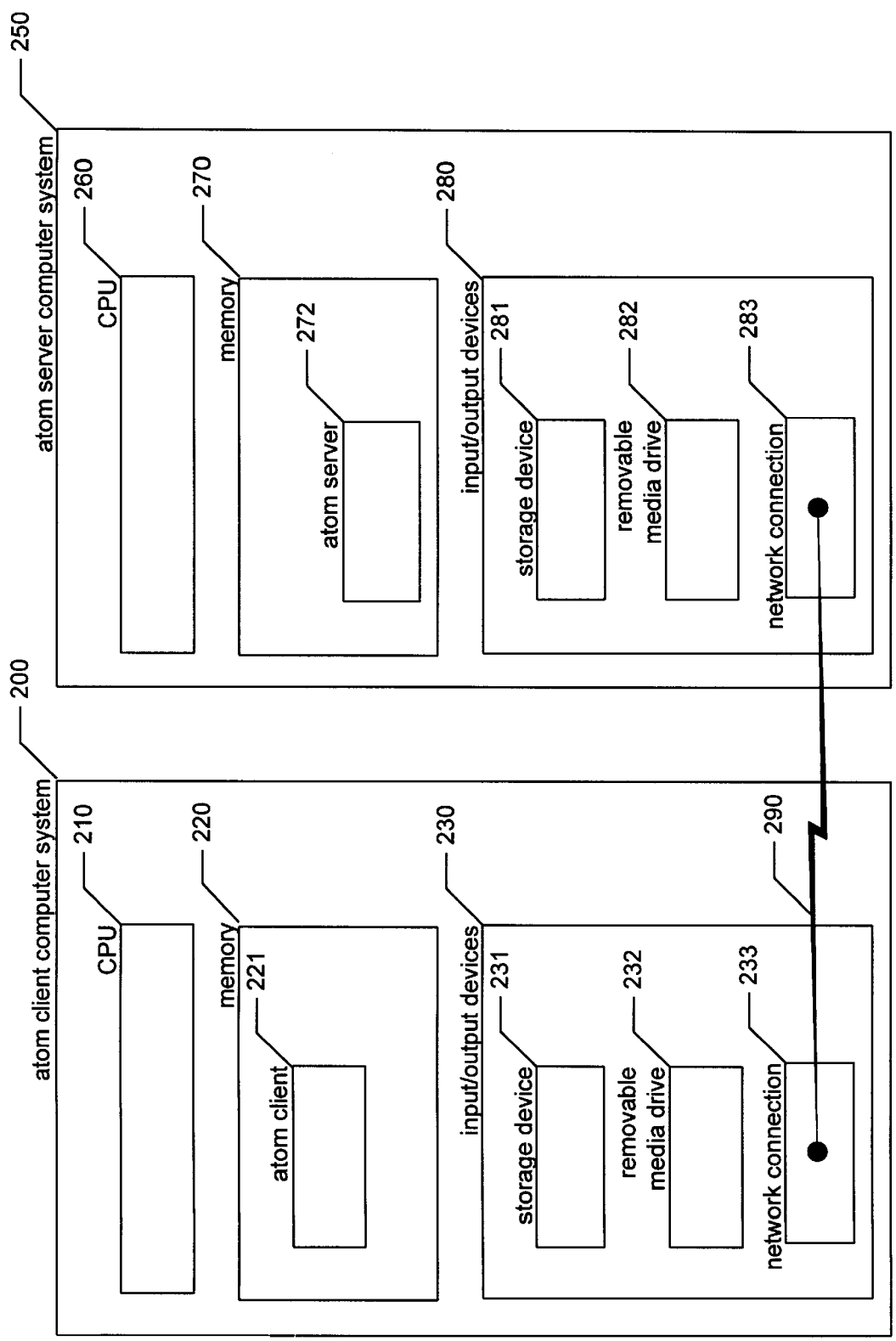
FIG. 2 is a system diagram showing separate atom client and atom server computer systems upon which the atom client and atom server, respectively, may execute.

FIG. 2 is a system diagram showing separate atom client and atom server computer systems upon which the atom client and atom server, respectively, may execute. The atom client computer system 200 contains a central processing unit (CPU) 210, a memory 220 containing the atom client 221, and input/output devices 230 including a non-volatile storage device 231, a removable media drive 232, and a network connection 233 for connecting the computer system to a network. The atom server computer system 250 contains a central processing unit (CPU) 260, a memory 270 containing the atom server 272, and input/output devices 280 including a nonvolatile storage device 281, a removable media drive 282, and a network connection 283 for connecting the computer system to a network. The network connections of the atom client and atom server computer systems are preferably connected by a network 290, enabling the atom client and atom server computer systems to exchange data. The network may be of any virtually any type, e.g., a local-area network, a wide-area network, the Internet, an analog or digital telephone connection, or combinations thereof. While the atom client and atom server are preferably implemented on computer systems configured as described above, those skilled in the art will recognize that they may also be implemented on computer systems having different configurations.

In order to illustrate embodiments of the present invention, it is described herein with reference to a simple example. Those skilled in the art will recognize that the invention may be straightforwardly applied to resolving atoms of arbitrary size and complexity. In the example, the atom server differentially resolves a drawing application atom to differing drawing application programs depending on the nature of the user of the atom client. In general, the drawing application allows the user to drag objects in a drawing from their existing location to a new location. The differential resolutions of the drawing application atom causes the drawing application to exhibit different behaviors while dragging objects, depending on the nature of the user. The example is discussed in conjunction with an embodiment of the invention that is based on a relational database.

Those skilled in the art will recognize that the present invention may also be gainfully and straightforwardly implemented using object-oriented databases, which provide powerful mechanisms for comparing conditions to context data and for managing lists and hierarchies.

Figure 3A:
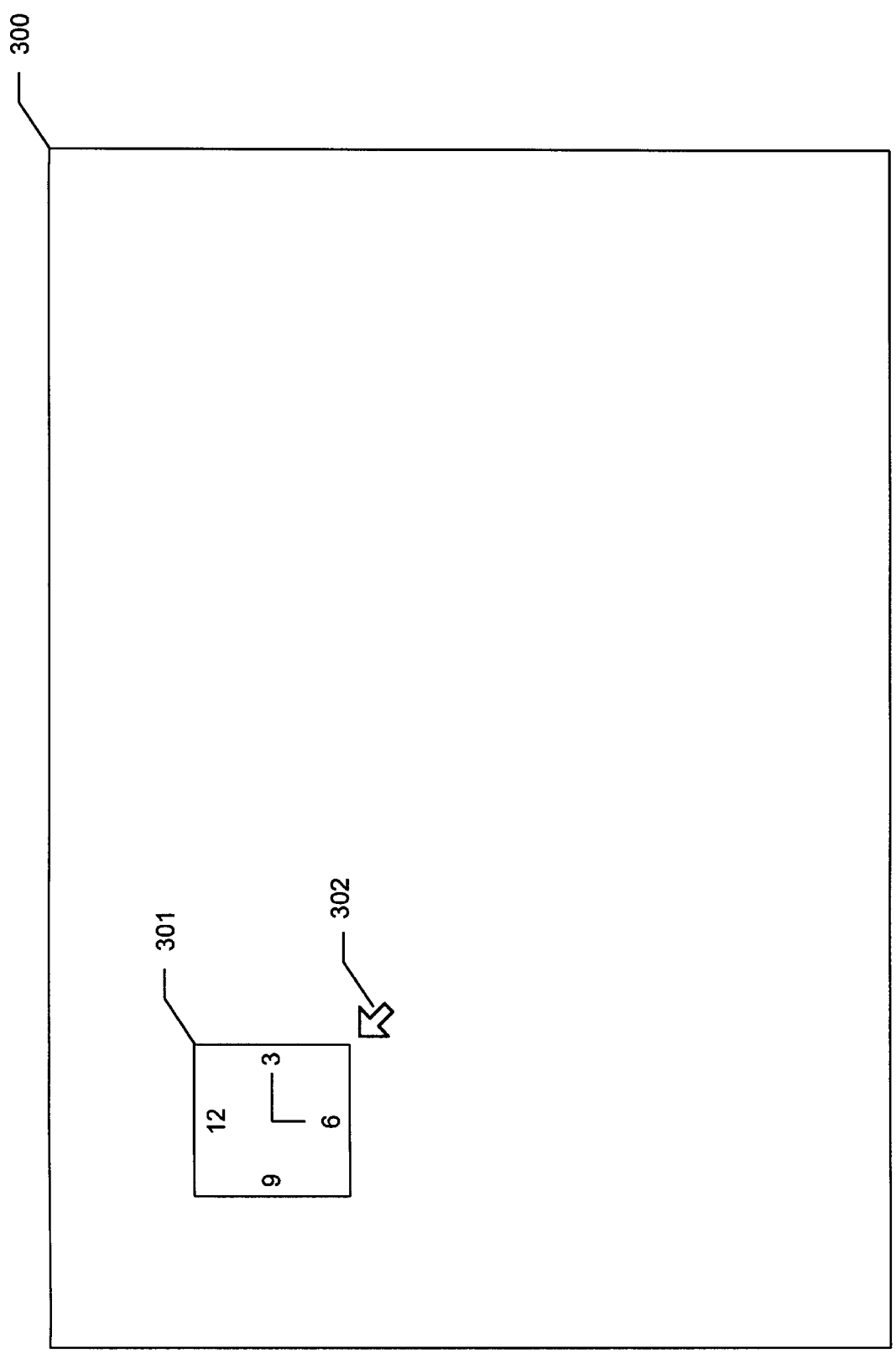
FIGS. 3A–C are screen diagrams showing a standard dragging behavior exhibited by a resolution of the drawing program.
Figure 3B:
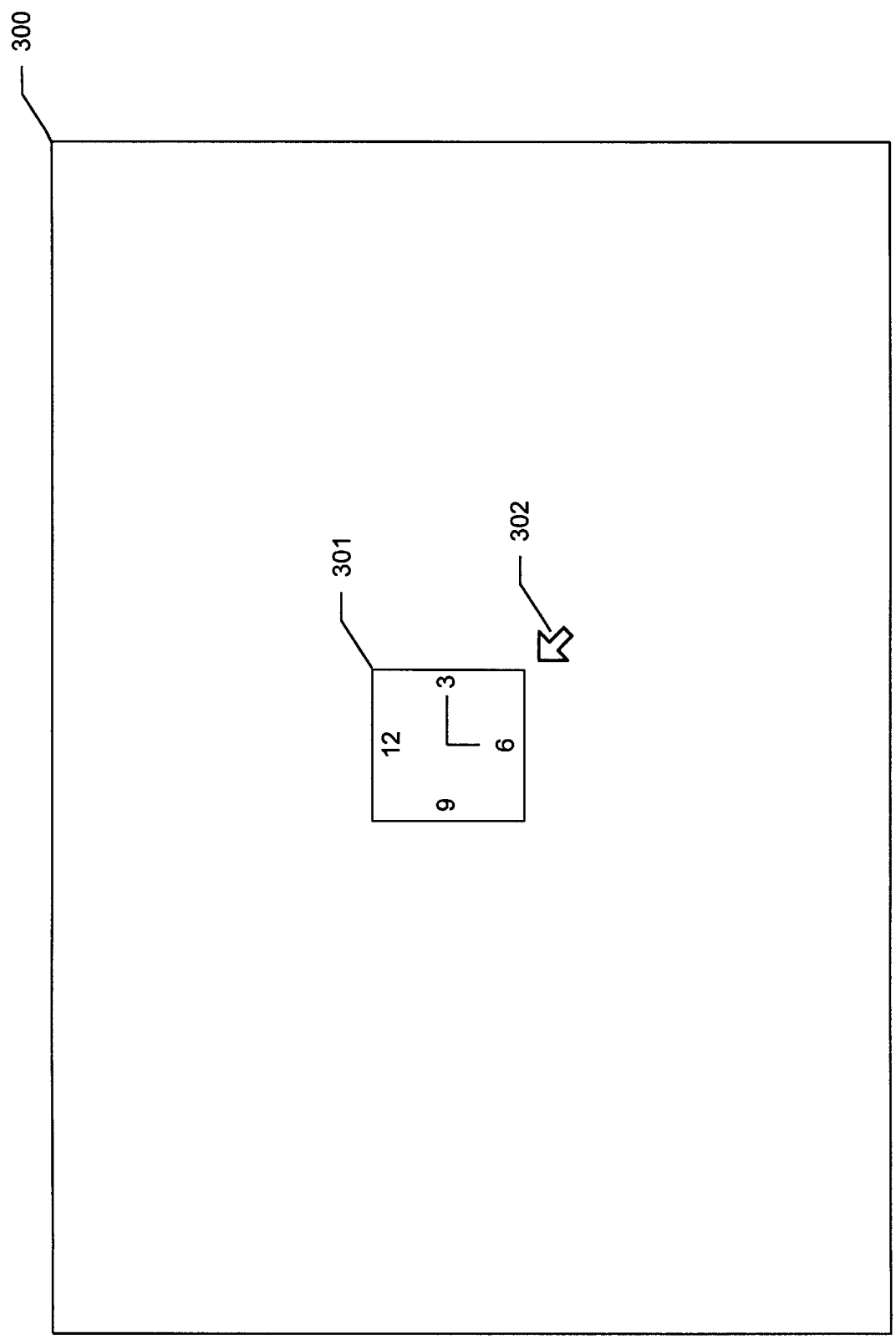
Figure 3C:
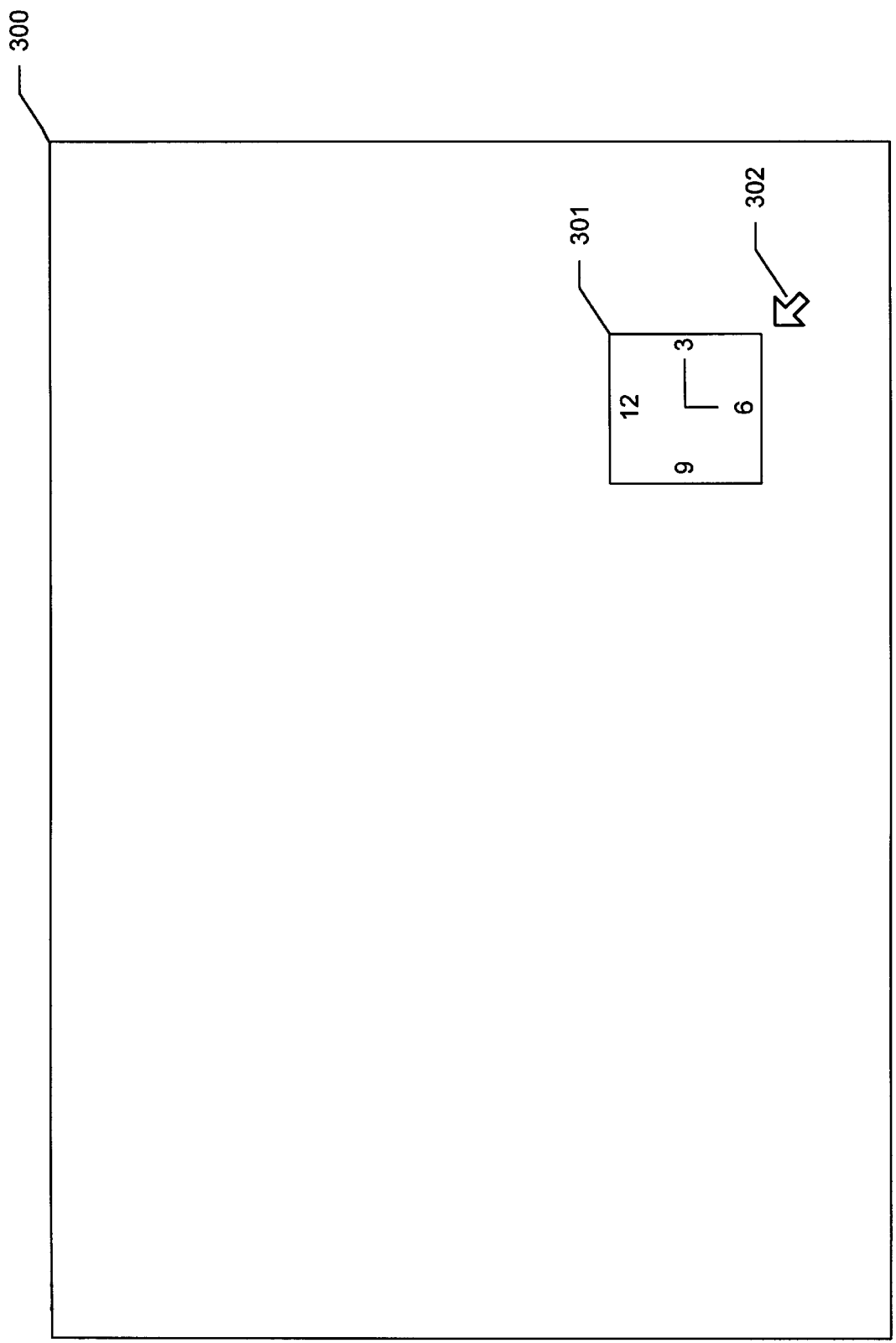

FIGS. 3A–C are screen diagrams showing a standard dragging behavior exhibited by a resolution of the drawing program atom, in which the dragged object moves with a user-controlled pointer from an initial location to a final location. FIG. 3A shows the contents of a sample drawing before dragging begins. The drawing 300 contains a clock object 301 at an initial location near the upper left corner of the drawing. Also shown is a pointer 302 controlled by the user using an input device such as a mouse. In order to drag the clock object, the user uses the input device to move the pointer to a location near the clock object, depresses a button on the input device, moves the pointer within the drawing to a final location, and releases the button. FIG. 3B shows the contents of the sample drawing during dragging. It can be seen the clock object has been moved with the pointer to an intermediate location near the center of the drawing. FIG. 3C shows the contents of the sample drawing after dragging concludes. It can be seen that the clock object has been moved with the pointer to a final location near the lower right corner of the drawing.

Figure 4A:
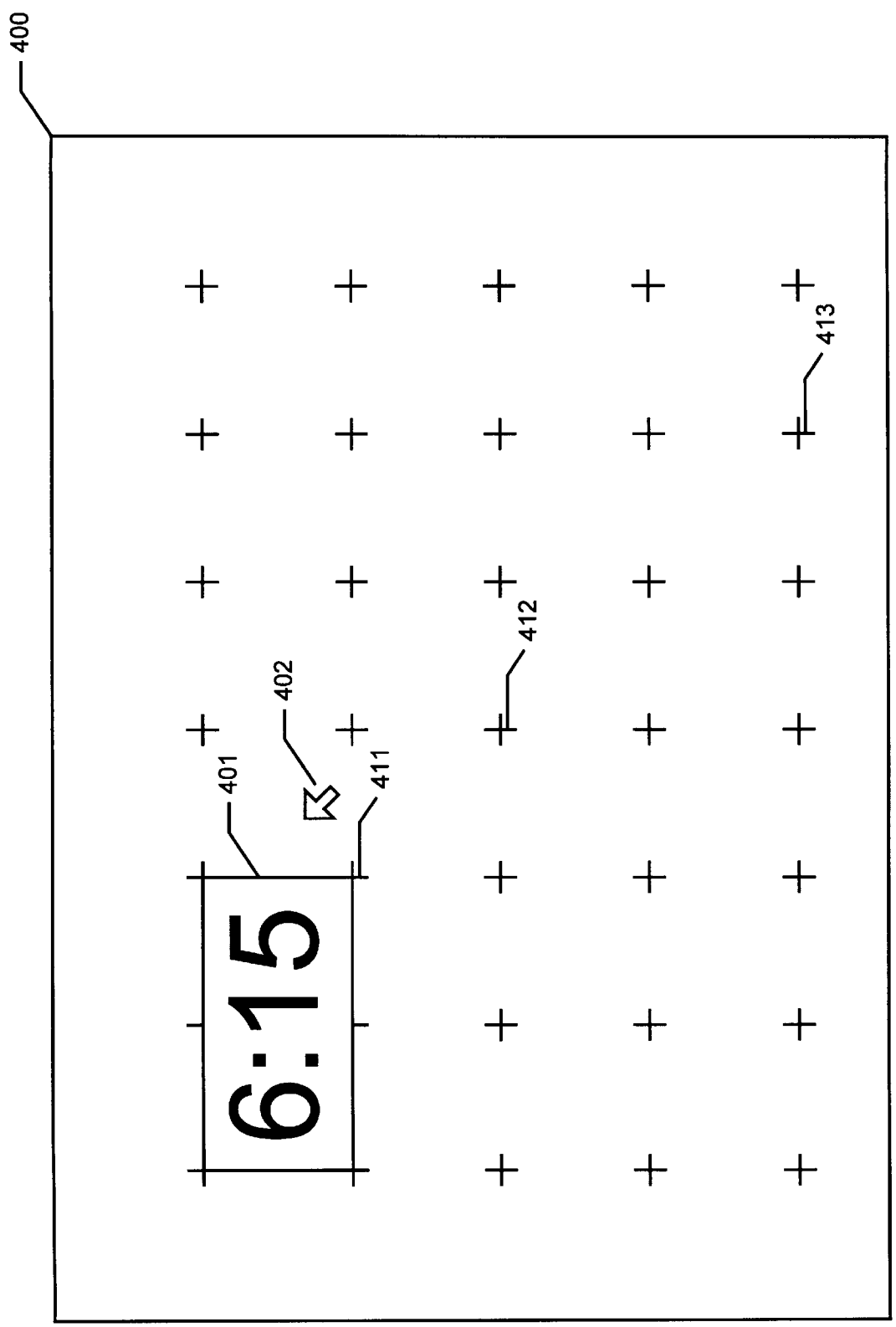
FIGS. 4A–C are screen diagrams showing a dragging behavior exhibited by a resolution of the drawing program suited to users who are engineers.
Figure 4:
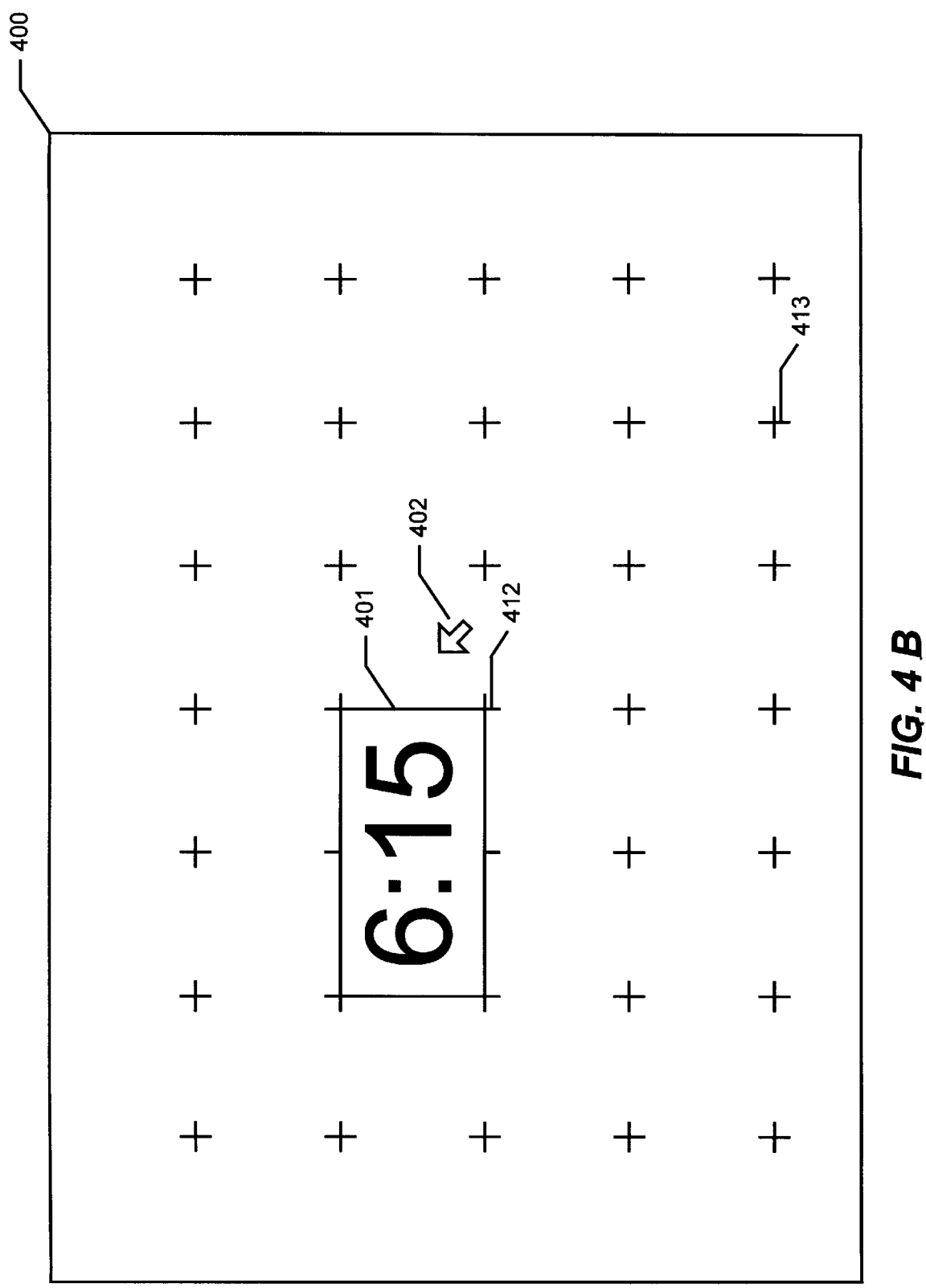
Figure 4C:
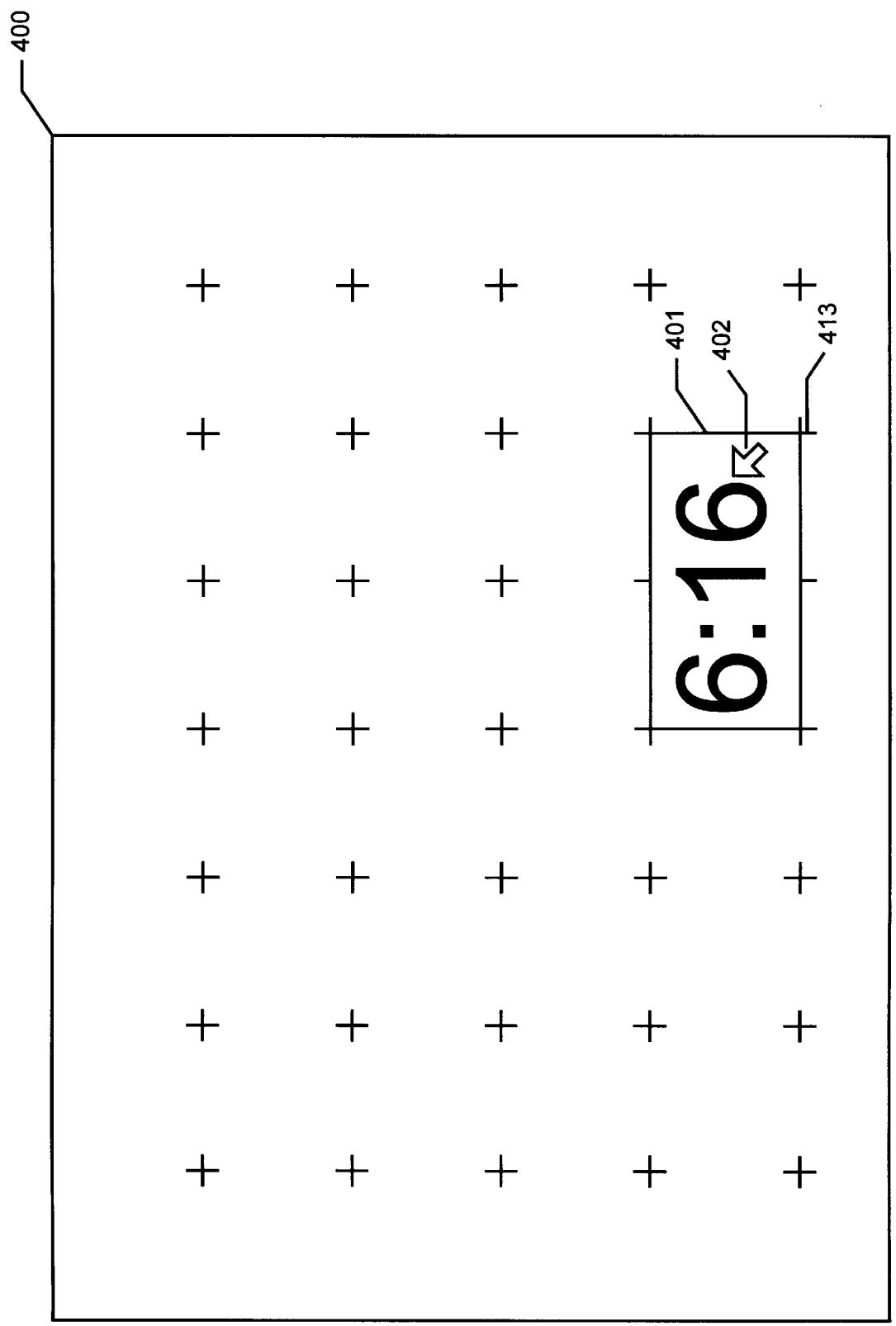

FIGS. 4A–C are screen diagrams showing a dragging behavior exhibited by a resolution of the drawing program suited to users who are engineers, in which the dragged object does not move directly with the pointer, but rather repeatedly "snaps" to one of a set of discrete positions to which the pointer is nearest while the object is being dragged. This dragging behavior facilitates the alignment of different objects within a drawing, and is therefore generally useful to users who are engineers. FIG. 4A shows the contents of a sample drawing before dragging begins. Besides a clock object 401 and a pointer 402, a number of discrete locations including 411–413 to which the clock object can be dragged are shown. FIG. 4B shows the contents of the sample drawing during dragging. It can be seen that the clock object has been moved roughly with the pointer to discrete location 412. FIG. 4C shows the contents of the sample drawing after dragging concludes. It can be seen that the clock object has been moved roughly with the pointer to discrete location 413.

Figure 5A:
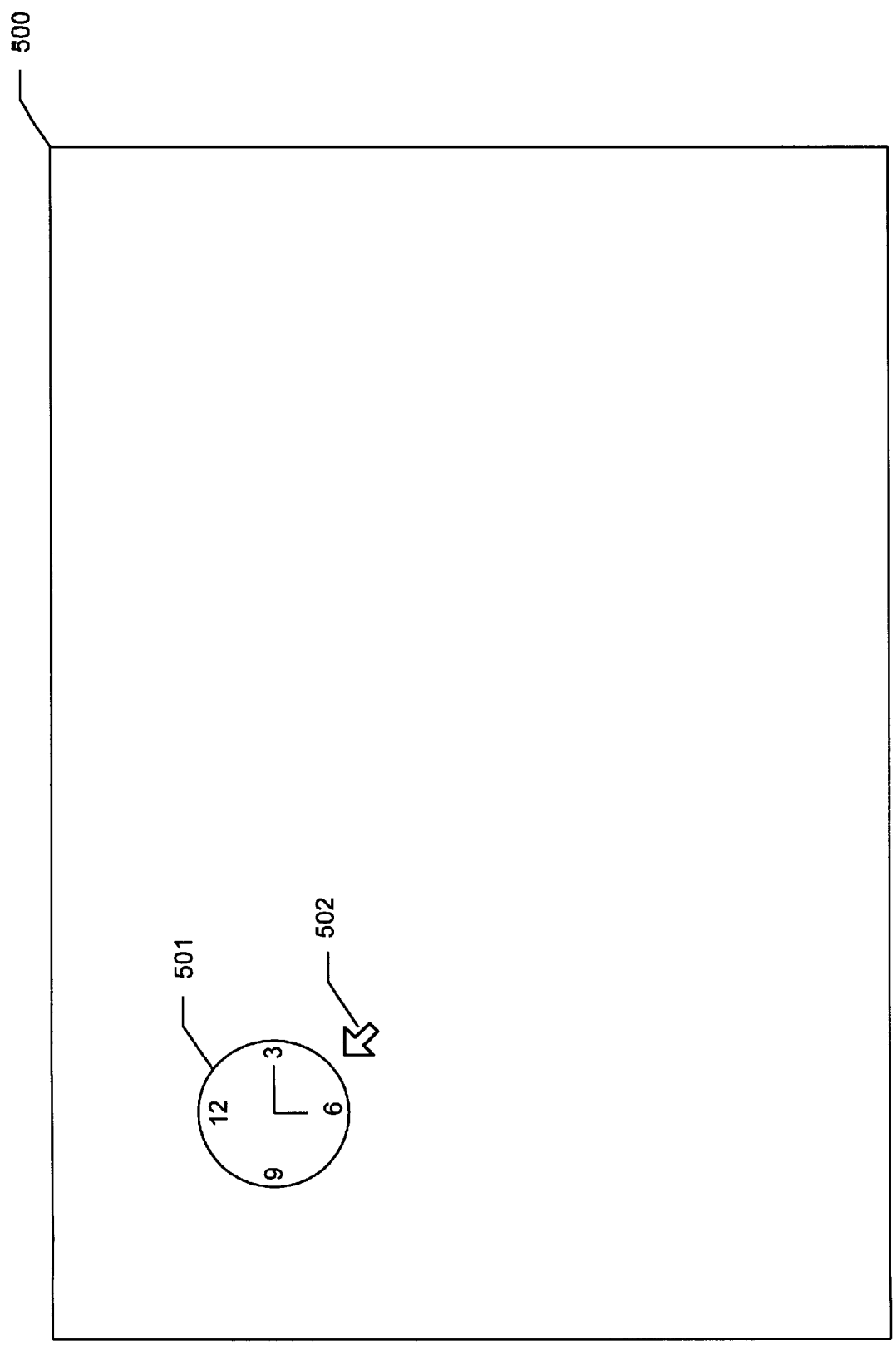
FIGS. 5A–E are screen diagrams showing a dragging behavior exhibited by a resolution of the drawing program suited to users who are children.
Figure 5B:
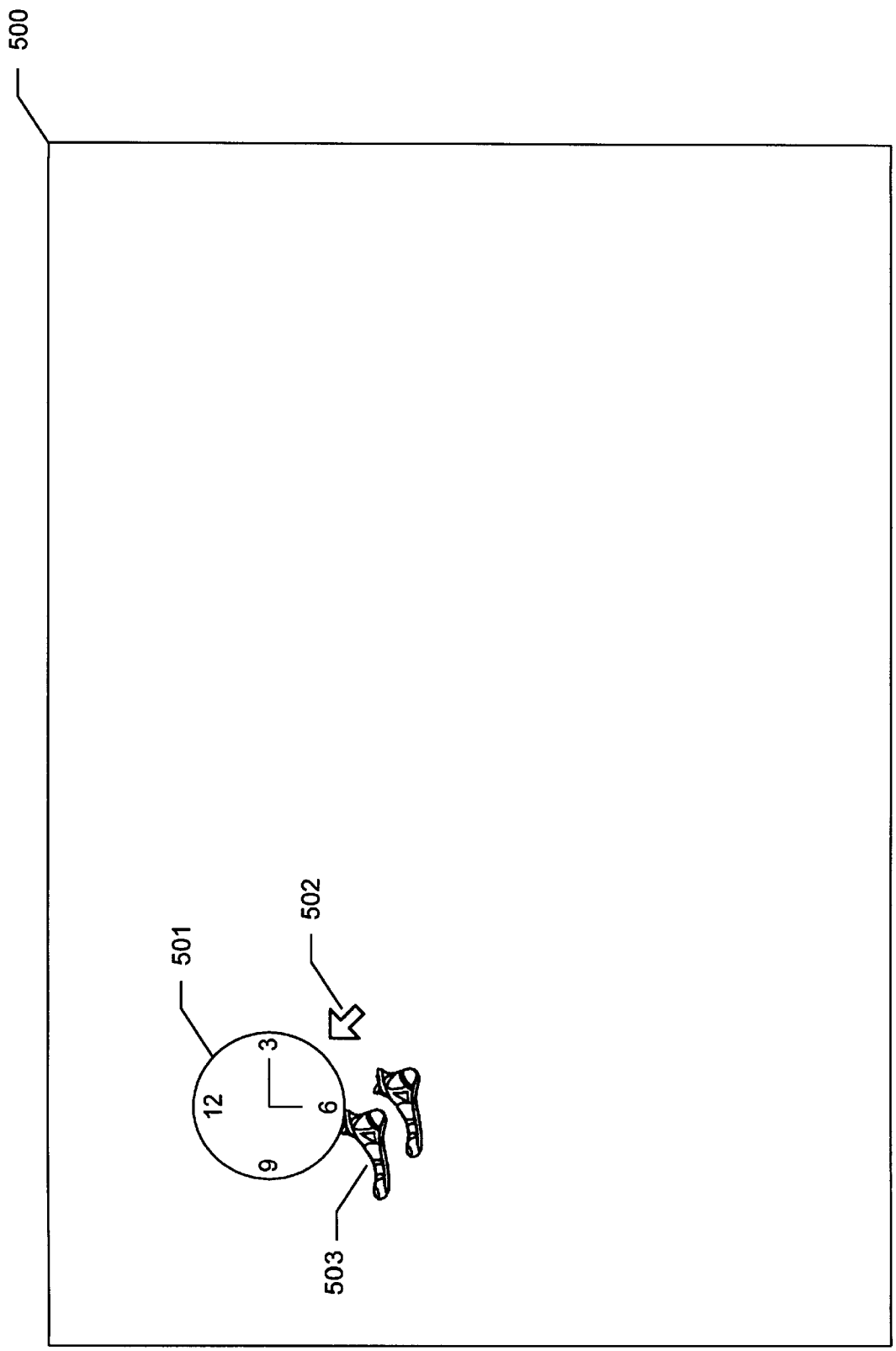
Figure 5C:
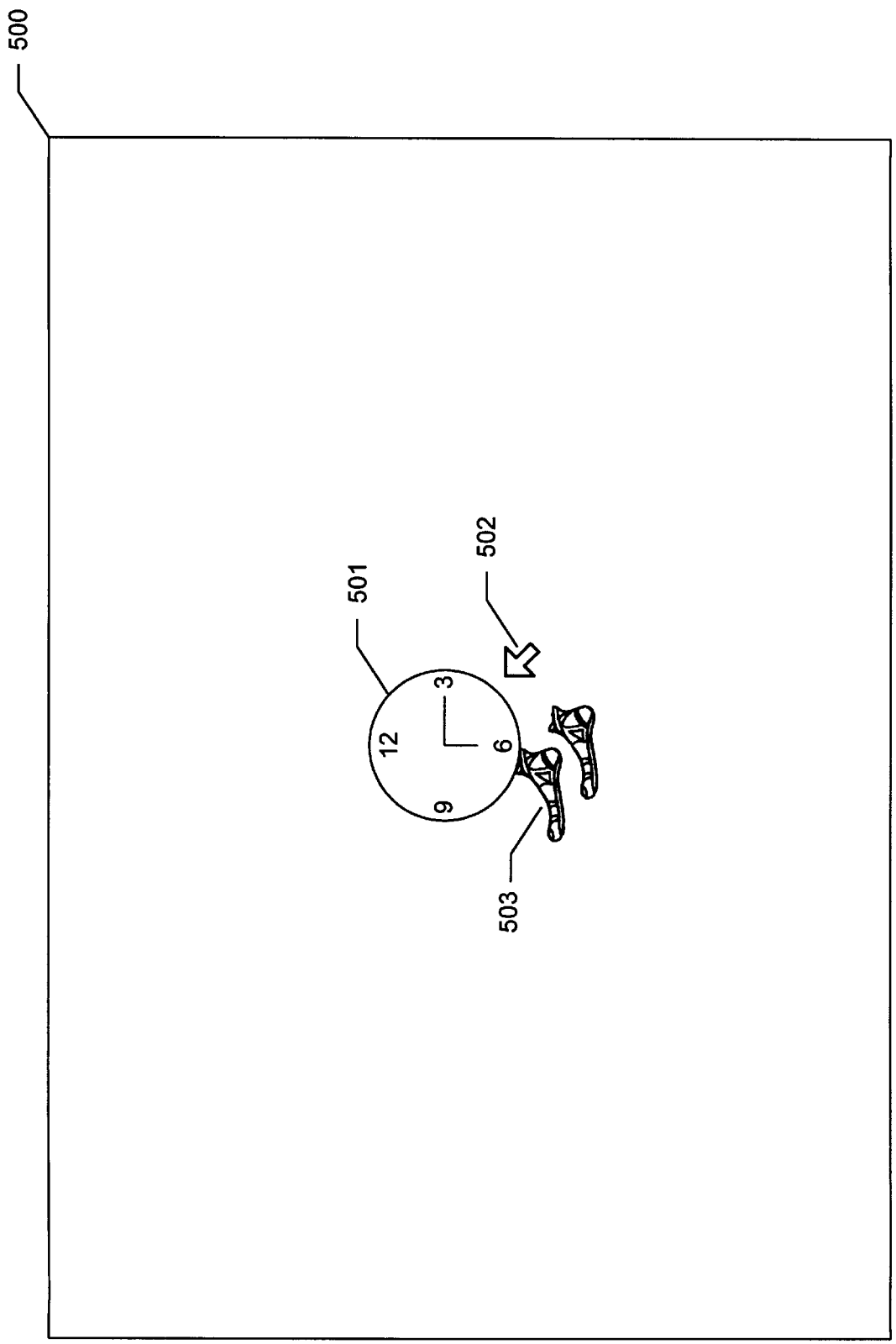
Figure 5D:
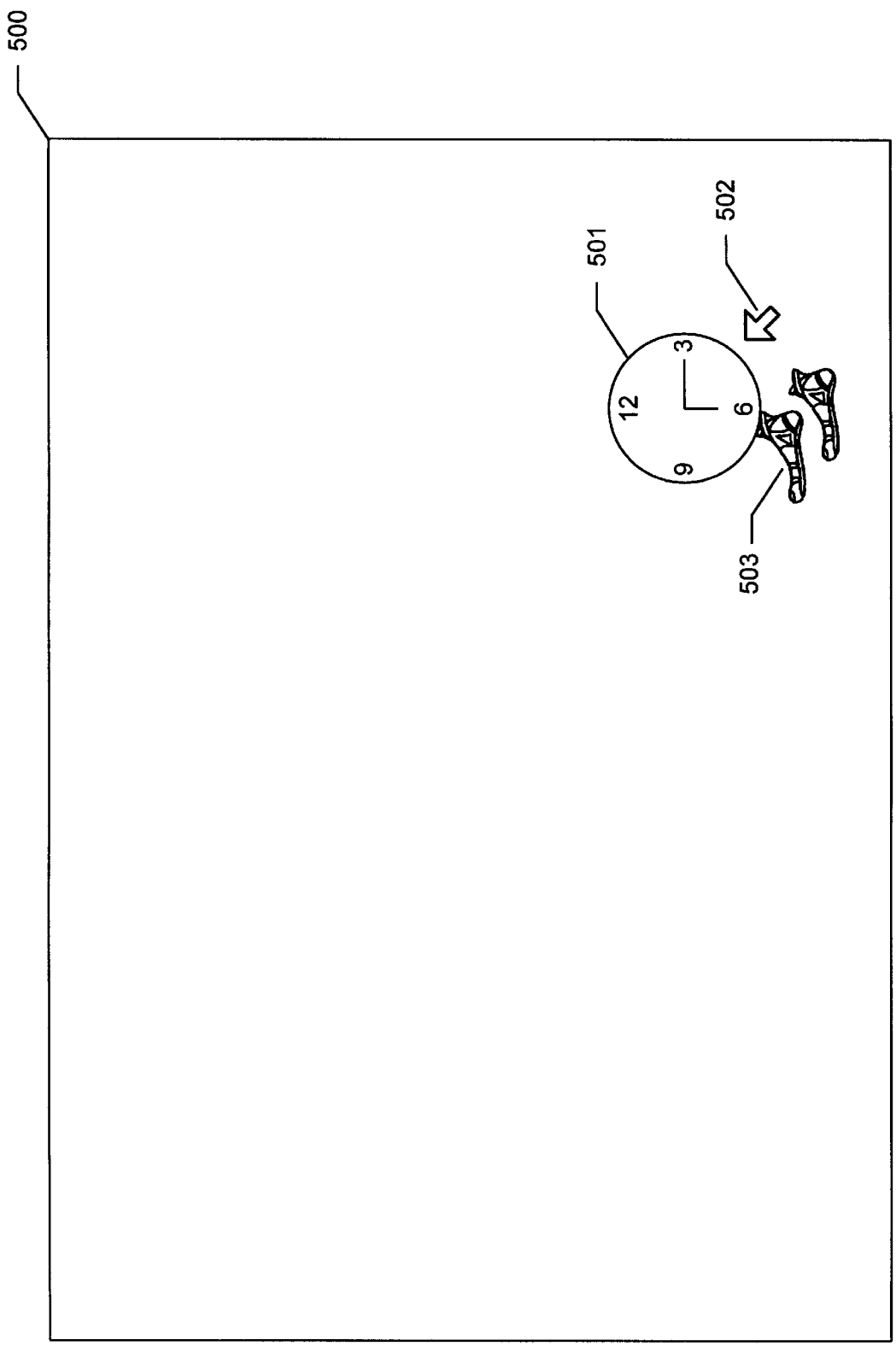
Figure 5E:
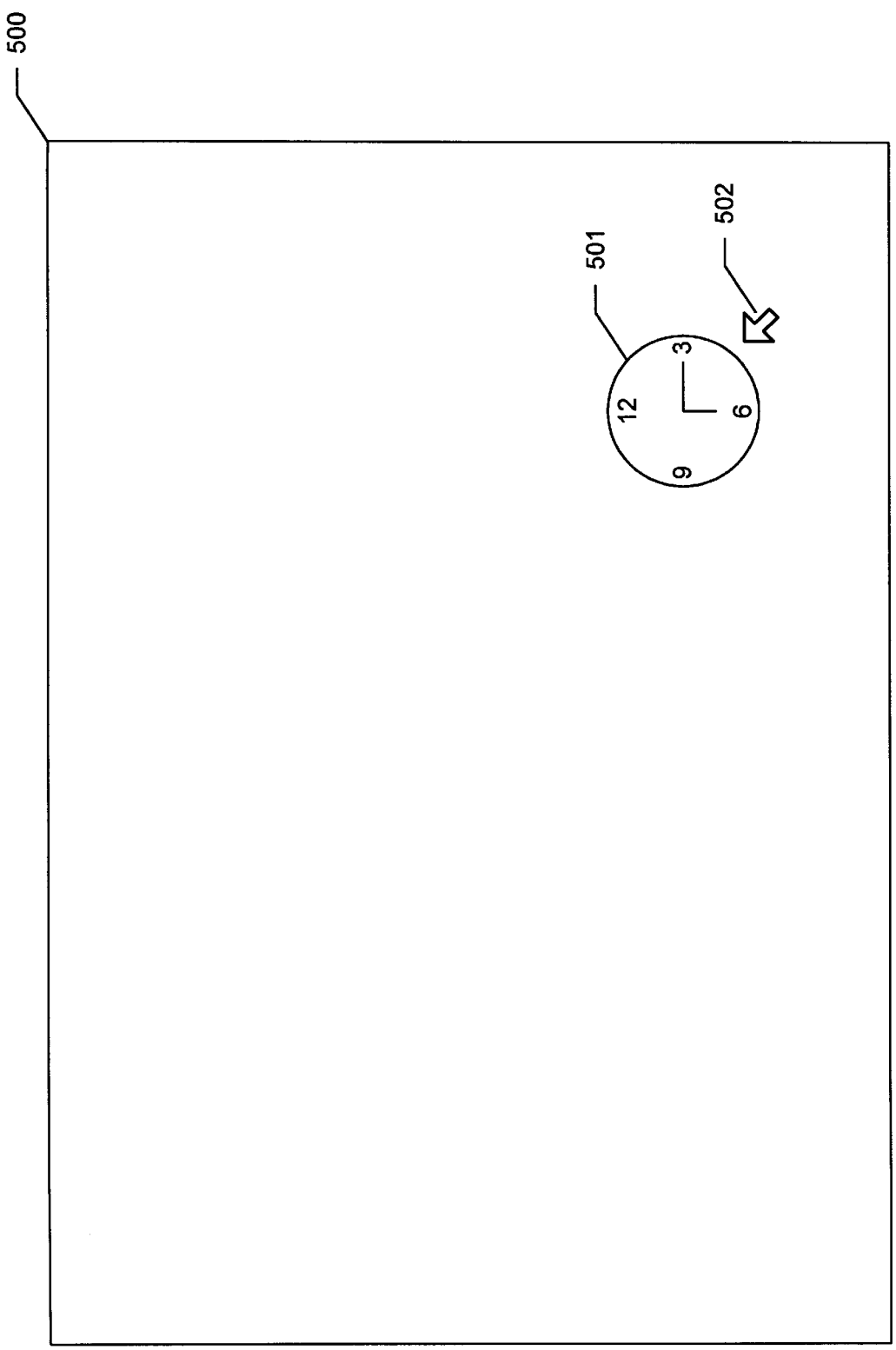

FIGS. 5A–E are screen diagrams showing a dragging behavior exhibited by a resolution of the drawing program suited to users who are children, in which "feet" are displayed for the dragged object while it is being dragged, indicating to users who are children that they may move the object by moving the input device. FIG. 5A shows the contents of a sample drawing before dragging begins. FIG. 5B shows the contents of the sample drawing at the point when dragging begins. It can be seen that depressing the input device button to begin dragging causes feet to be displayed for the clock object, indicating that the object may be dragged. FIG. 5C shows the contents of the sample drawing during dragging. FIG. 5D shows the contents of the sample drawing at the conclusion of dragging, and FIG. 5E shows the contents of the sample drawing after the input device button has been released. It can be seen that feet are no longer displayed for the clock object, indicating that the object may not presently be dragged. The appearance of the feet displayed for the dragged object in this drawing behavior may be varied based on context information such as the season of the year, the user's favorite sport, or financial subsidization of the user by a sponsor.

The atom server resolves the drawing application atom to a drawing application having one of the above-discussed dragging behaviors based on context data relating to the user. The context data on which the resolution is based is arranged as a number of "category values," each storing one piece of data relating to a user. As discussed above, each category in the user context is derived from subcontexts based on the user's identity, including an individual subcontext containing information pertaining directly to the user, group contexts combining information pertaining to a group of users of which the user is a member, and a general subcontext containing information pertaining to all users. For example, one category used to resolve the drawing application atom is an age group category. The atom server maintains one age group category value per user context, which indicates the age group of the user of the context, and which is derived from the individual context for the user. Some categories do not relate to a particular user, but rather relate to all users, and are therefore derived from the general subcontext. An example is a "season" category, which contains the present season of the year, and is the same for all users.

Figure 6:
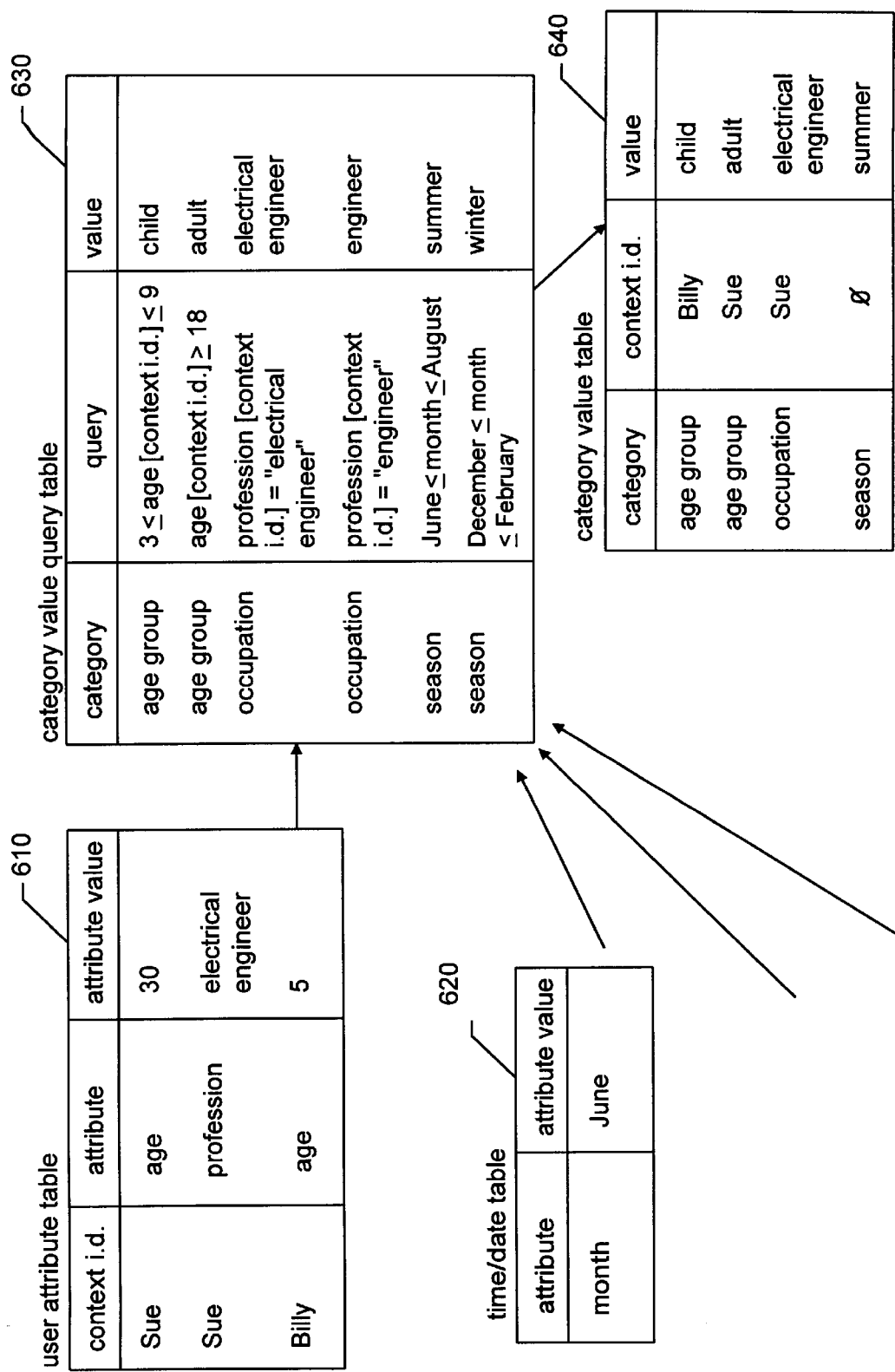
FIG. 6 is a table diagram showing the transformation of sample attribute data to category values against which the atom server can evaluate conditions for atom resolutions.

The atom server preferably generates category values from other, more basic data called attributes. For example, the age group category value for a particular user is preferably derived from a more basic age attribute. FIG. 6 is a table diagram showing the transformation of sample attribute data into category values, against which the atom server can evaluate conditions for atom resolutions. FIG. 6 shows a category value table 640 containing category values against which the atom server evaluates conditions: an age group category having the value "child" for a user with context identifier "Billy" and the value "adult" for a user with context identifier "Sue," an occupation category having the value "electrical engineer" for the user with context identifier "Sue," and a season category having the value "summer" for all user contexts.

In accordance with a preferred embodiment of the invention, the atom server generates the category values stored in the category value table from user attributes and other information using a category value query table 630. The category value query table specifies, for each category, how to generate the category's value for a context based on information from attribute tables and other sources of information. The category value query table specifies using user attribute information from a user attribute table 610 and date-type information from a time/date table 620 to generate category values. For example, in its first entry, the category value query table specifies that the age group category value "child" should be generated for contexts in which the age attribute is between 3 and 9. As such, because the age attribute value for Billy's context is "5," the value shown for the age group category for Billy's context in the category value table is "child." The user attribute information on which this determination is based may preferably be updated by the user or by others on the users behalf. The atom server preferably triggers a regeneration of affected category values when the user attribute information is updated. As another example, in its fourth entry, the category value query table specifies that the season category value "summer" should 30 be generated for all contexts if the month attribute is between "June" and "August." As such, because the month attribute value is "June," the value shown for the market that the season category has the value summer for all contexts. The atom server preferably supports queries for obtaining data from a variety of sources besides attribute tables. For example, instead of specifying that the season category value is retrieved from an attribute table like the time/date table, the category value query table could instead specify that the season category value is generated based on a query of an external database, or based on an operating system timekeeping call. The regeneration of category values from these other data sources is probably also triggered by changes to the relevant data in the data source. For example, when the month attribute value changes, the season category value is preferably regenerated. The relation of the specific contents of the category value table to the example are discussed further below.

The possible values for each category are preferably arranged in a hierarchy used to evaluate conditions on the category values. The values for each category are arranged from most general to most specific. This enables conditions to specify that the value of a particular category must be either a specified category value or a more specific category value that is a more specific child of the specified category value in the hierarchy. For example, in some cases a condition specifying that a user's occupation is "engineer" should be satisfied for a user whose occupation is "electrical engineer."

Figures 7, 8:
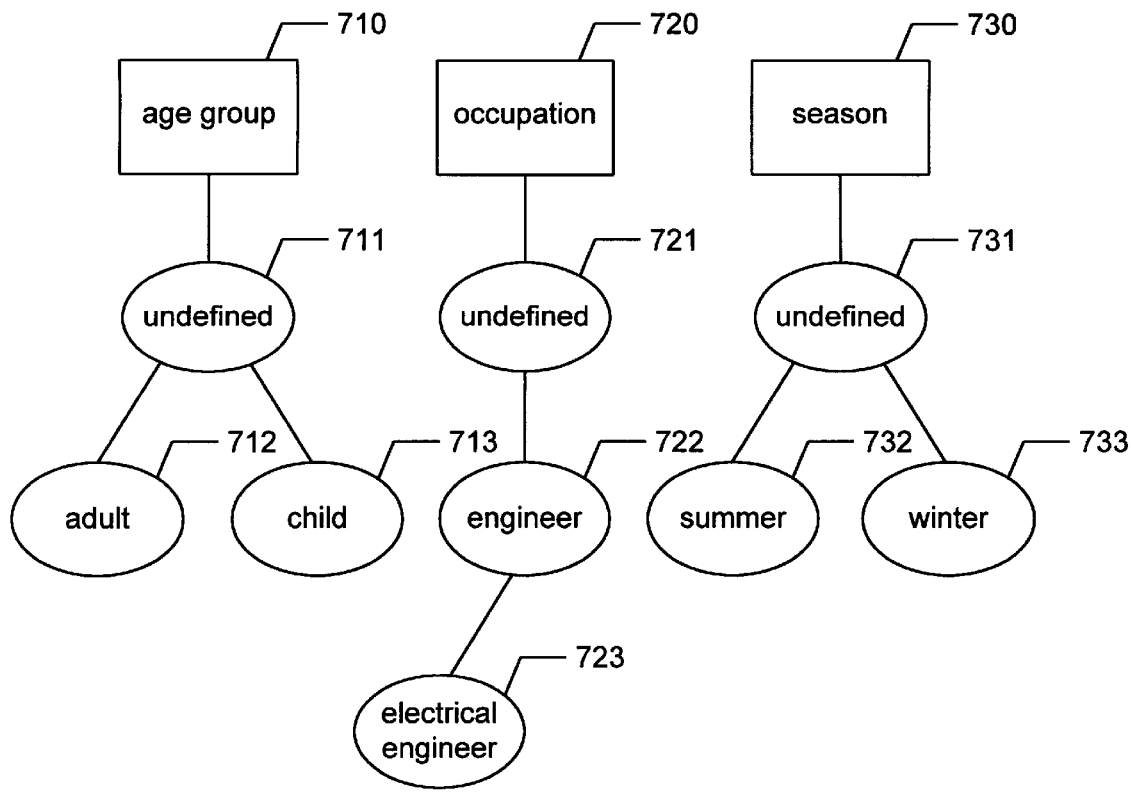
FIG. 7 shows a series of tree diagrams showing the category value hierarchies for three sample categories.
FIG. 8 is a table diagram showing an alternate representation of category value hierarchies.

FIG. 7 shows a series of tree diagrams showing the category value hierarchies for three sample categories. FIG. 7 shows an age group category value hierarchy 710, an occupation category value hierarchy 720, and a season category value hierarchy 730. Each category value hierarchy has an undefined node (711, 721, 731) as its head, or most general, node, which applies when a category has no value for a particular user. For example, the occupation group category for Billy has no value, and is therefore undefined. The undefined node for the age group category value hierarchy has two child nodes: an adult node 712 and a child node 713. The undefined node of the season category value hierarchy similarly has two child nodes: a summer node 732 and a winter node 733. The undefined node of the occupation category value hierarchy has one child node, the engineer node 722, which itself has a child node, the electrical engineer node 723. As such, conditions may be created that are satisfied when the occupation category contains either the value "engineer," or the value "electrical engineer."

FIG. 8 is a table diagram showing an alternate representation of the category value hierarchies shown in FIG. 7. The category value hierarchies table 810 is comprised of rows each representing a single parent-child relationship between two category values of a particular category. Each row contains a category field indicating a particular category value hierarchy, a child category value, identifying the child node in the parent-child relationship, and a parent category value, indicating the parent node in the parent-child relationship. For example, the third line shows that, in the occupation category value hierarchy, the category value "engineer" is a child of the undefined category value. The fourth line indicates that, in the occupation category value hierarchy, the category value "electrical engineer" is a child of the category value "engineer." The atom server may use both category value hierarchies table shown in FIG. 8 and the category value hierarchy trees shown in FIG. 7 to represent the category value hierarchies. The user may preferably modify either representation of the category value for a category hierarchies in order to define the relationship between a new category value for a category and existing category values for that category.

Figure 9B:
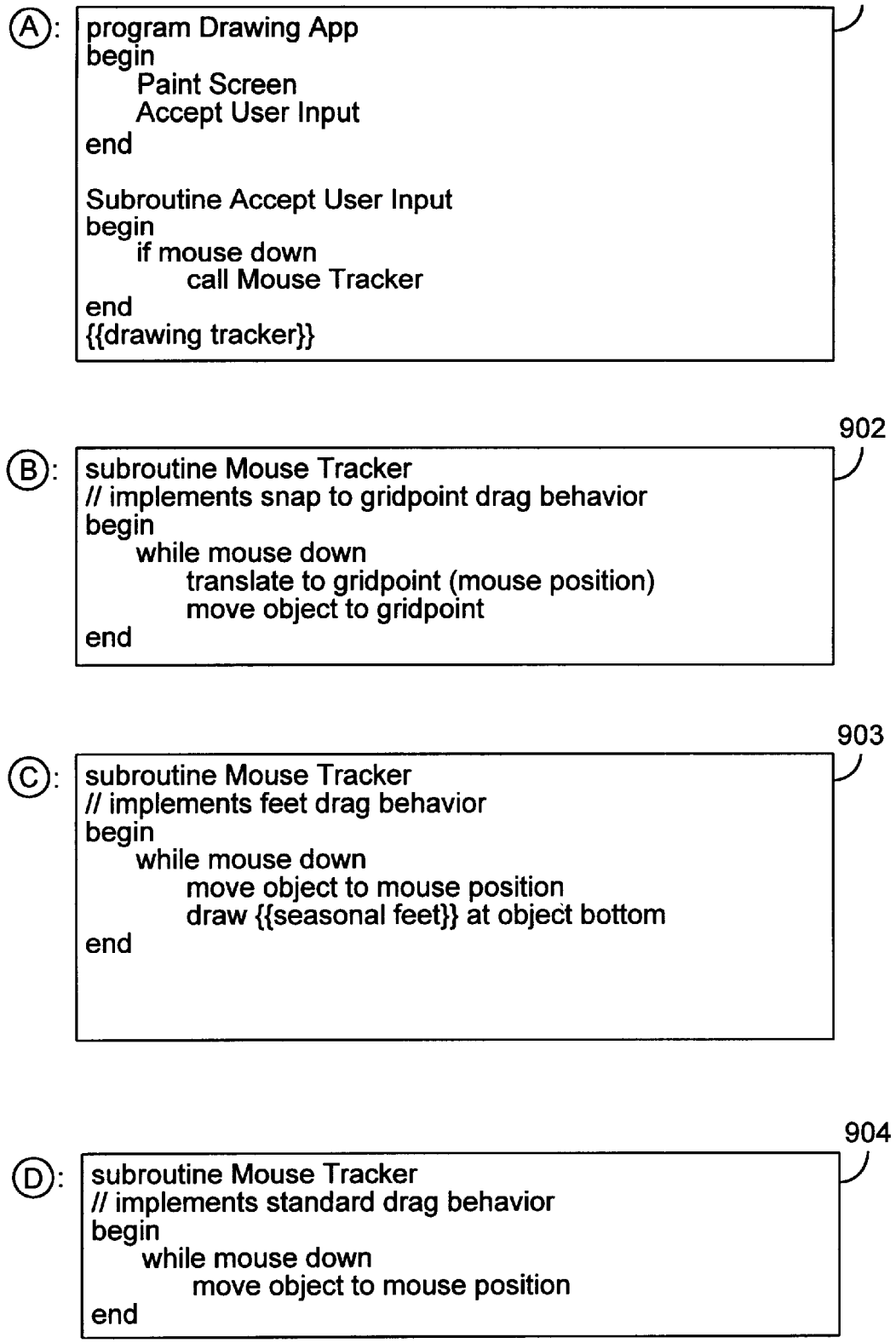
Figure 9C:
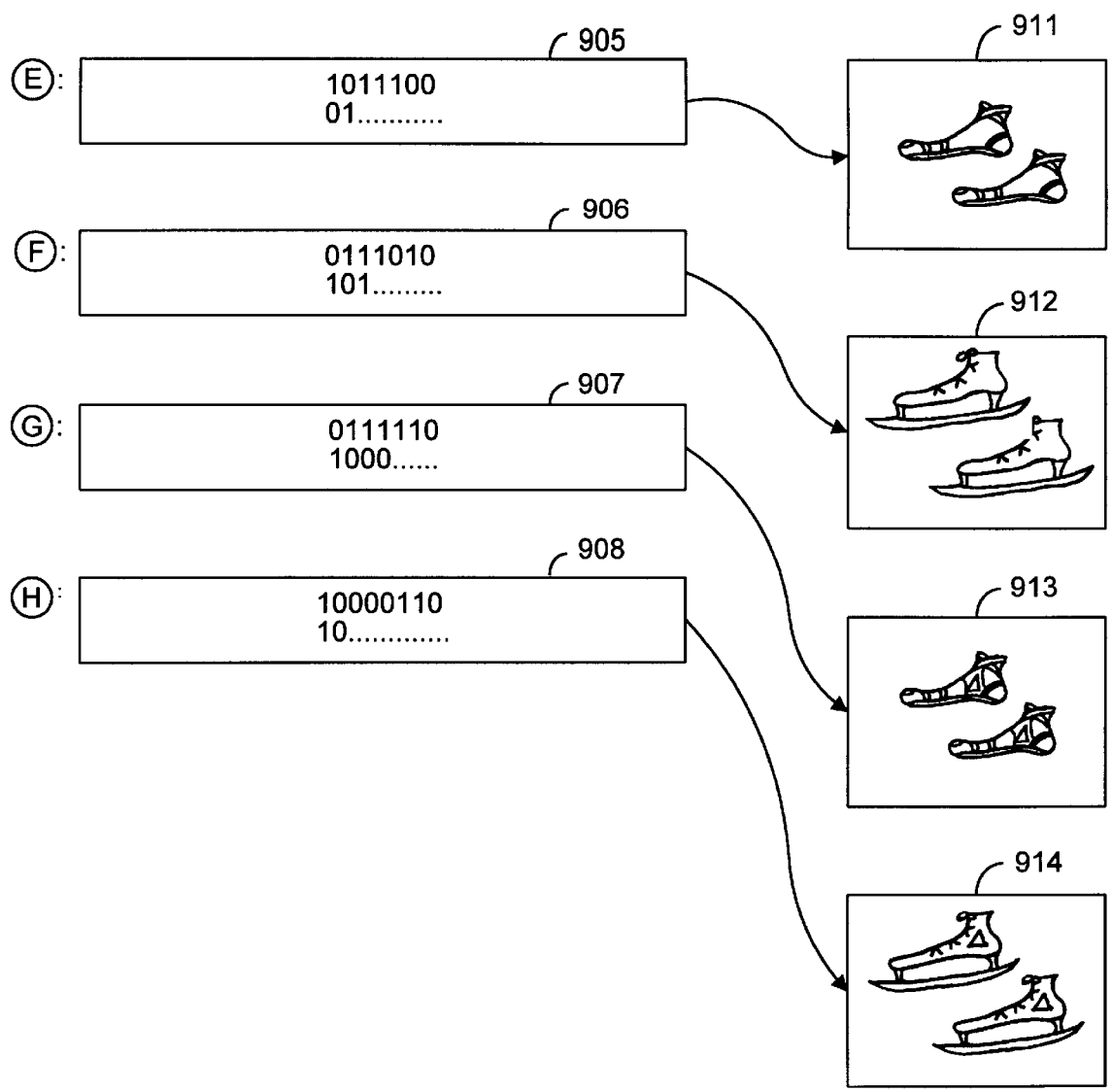

FIGS. 9A–C together comprise a table diagram showing sample atom tables. The sample atom tables shown contain resolutions of the drawing application atom described above, as well as resolutions of other atoms contained therein. FIG. 9A shows three atom tables, which are all searched by the atom server for matching resolutions when resolving an atom: application atom table 910, sponsor atom table 920, and user atom table 930. The three atom tables preferably each correspond to different sources of atom resolutions: the application atom table contains resolutions created by the developers of the drawing application and other applications; the sponsor atom table contains the solutions created as advertisement by or on behalf of companies who sponsor use of the application by users; and the user atom table contains resolutions created by or on behalf of the user. Atoms may be resolved by the atom server to resolutions in any of the atom tables.

Each atom table is paired with a condition group table containing conditions for the resolutions contained in the atom table: application condition group atom condition group table 915, sponsor condition group table 925, and user condition group table 935. The atom tables are made up of entries, each representing one atom resolution and having three parts: an atom identifier ("atom i.d.") for the atom for which the resolution may be returned; a condition group identifier ("condition group i.d.") identifying a group of conditions, or "condition group," in the corresponding atom condition group table that are associated with the resolution; and the atom resolution itself, which includes the type of the resolution and the data for the resolution. FIGS. 9B–C show the actual data for each resolution. For example, the fifth entry in the application atom table is a resolution of a "seasonal feet" atom, has conditions identified by the condition group identifier "268," and constitutes a "gif" (graphics interchange format) type resolution whose data 905 shown in FIG. 9C. The conditions for this resolution of the seasonal feet atom appear in the third and fourth entries of the application condition group table: the age group category value for the context must be equal to "child," and the season category value must be equal to "summer." The relation of the specific contents of the atom tables and condition group tables to the example are discussed further below.

The client uses a Resolve Atom function to resolve an atom. The Resolve Atom function is preferably called by the atom client in order to resolve an atom needed by the client. In embodiments in which the atom client and atom server execute on different computer system, the atom client preferably calls the Resolve Atom function using a remote procedure call mechanism. The Resolve Atom function preferably also calls itself recursively within the atom server to resolve atoms contained in the resolutions of atoms requested by the atom client. Atoms contained in atom resolutions are also known as "embedded atoms."

Figure 10:
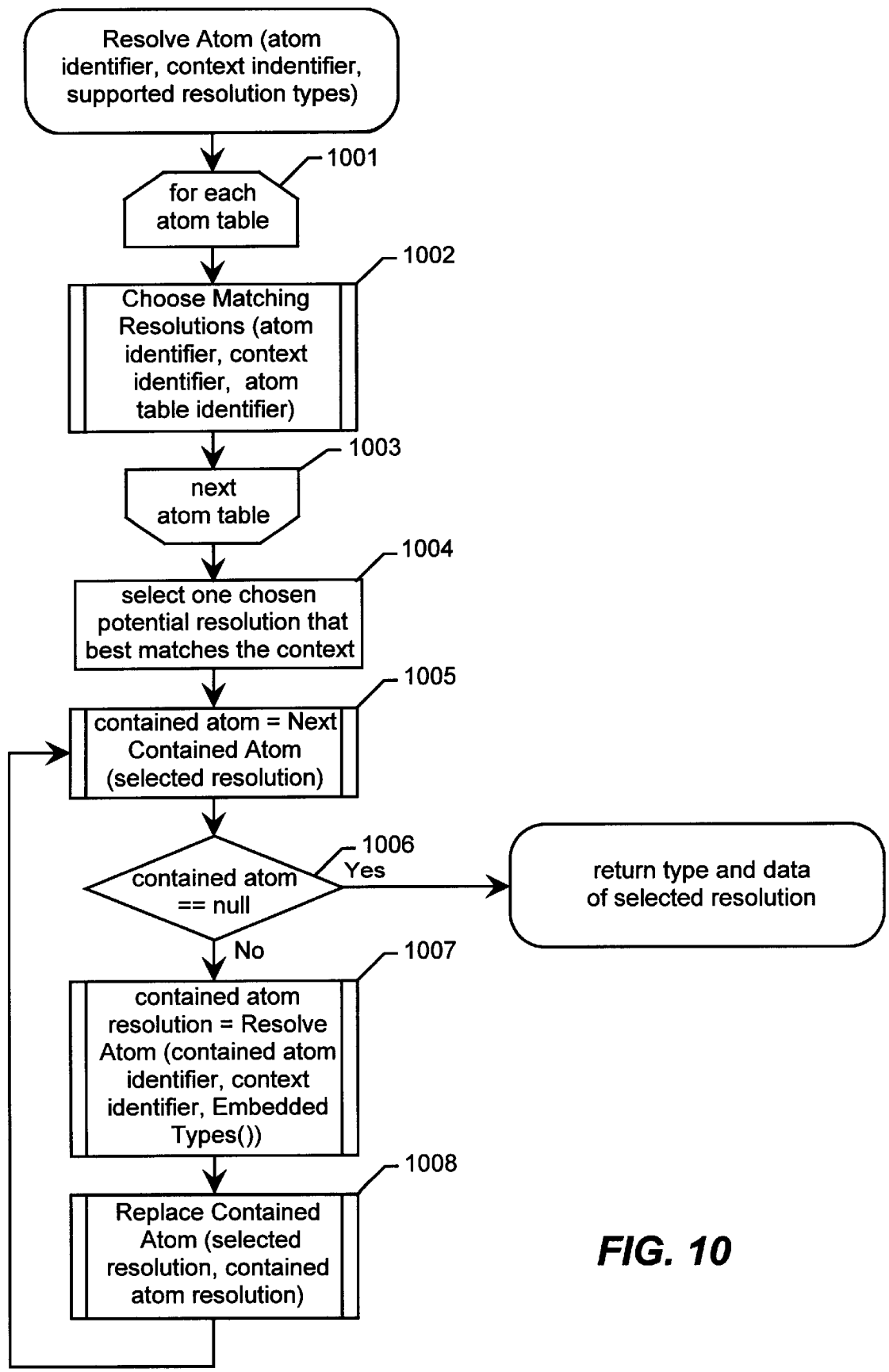
FIG. 10 is a flow diagram showing a Resolve Atom function used by the atom server to resolve an atom.

FIG. 10 is a flow diagram showing a Resolve Atom function used by the atom server to resolve an atom. Briefly, the Resolve Atom function identifies resolutions in the atom tables in which the atom identifier is the same as the requested atom identifier, chooses from these resolutions those whose conditions are substantially satisfied by the requested context, and then selects from the chosen resolutions the one resolution that best suits the requested context. The Resolve Atom function takes as parameters the atom identifier of the atom to be resolved, the context identifier of the context for which the atom is to be resolved, and a list of the different resolution types supported by the atom client. The Resolve Atom function returns a resolution of the requested atom suited to the requested context, which preferably includes atom resolution data and an atom resolution type indicating the meaning of the atom resolution data. In cases in which resolutions of the requested atom have different types, the list of supported types is preferably used by the atom server to return a resolution whose type is among the types supported by the atom client. In these cases, the atom client preferably tests the returned resolution type to determine how to present the returned resolution data to the user. Those skilled in the art will recognize that, in cases in which the atom tables contain resolutions of an atom that are all of one type that can be successfully predicted by the client, resolution types need not be stored by the atom server and passed between the atom client and atom server.

In steps 1001–1003, the atom server chooses resolutions of the requested atom whose conditions are substantially satisfied by the requested context's category values from each of the atom tables appropriate for the requested context. With respect to the example, these include the application, sponsor, and user atom tables shown in FIG. 9A. While the loop limit symbols shown for steps 1001 and 1003 imply a sequentially-scheduled loop through the appropriate atom tables, in a preferred embodiment, the appropriate atom tables are instead searched in parallel. In step 1002, the atom server calls a Choose Matching Resolution function, discussed in detail below, to choose resolutions of the requested atom whose conditions are substantially satisfied.

In step 1004, the atom server selects from the resolutions of the requested atom chosen in steps 1001–1003 the resolution that best suits the requested context. Step 1004 preferably involves applying one or more selection rules, which may preferably favor one or more of the following kinds of resolutions: resolutions of types supported by the atom client, resolutions with the fewest unsatisfied conditions, resolutions with the most satisfied conditions, and resolutions from high-priority atom tables. Step 1004 may also preferably involve selecting the resolution that best suits the requested context using pattern recognition or region analysis techniques.

The resolution selected in step 1004 is the resolution ultimately returned to the atom client. This resolution may, however, contain embedded atoms to be resolved before returning the selected resolution to the atom client. In the steps 1005–1008, the atom server resolves any atoms contained in the resolution selected in step 1004. These steps call functions provided by a programmatic object called an accessor. An accessor is designated for each resolution type supported by the atom client. FIG. 11 shows pseudocode for a sample atom accessor table used by the atom server to identify the atom accessor for a particular containing resolution atom type. Each accessor provides three functions for accessing resolutions of that type: a Next Contained Atom function for returning the first contained atom occurring in a resolution, a Replace Contained Atom function for replacing the first contained atom occurring in a resolution with a resolution of the contained atom, and an Contained Types function for returning the resolution types with which the Replace Contained Atom is capable of replacing contained atoms. A sample accessor for ascii text 1202 is shown in FIG. 12. Those skilled in the art will recognize that accessors for other types of atoms, such as word processing documents in proprietary formats, may readily be implemented by those who understand the internal structure of such atoms.

In step 1005, the atom server calls the Next Contained Atom function of the accessor for the resolution type of the resolution selected in step 1004 to retrieve the first contained atom reference in the selected resolution, which contains an atom identifier for the embedded atom. If the selected resolution does not contain any embedded atoms that have not been resolved, then the Next Contained Atom function returns a null value. In step 1006, if the Next Contained Atom function returns a null value, then atom server returns the selected resolution to the atom client, else the atom server continues in step 1007. In step 1007, the atom server recursively calls the Resolve Atom function to resolve the contained atom for the requested context. As part of step 1007, the atom server calls the Contained Types function of the accessor to determine which resolution types are supported by the accessor, and passes the list of supported resolution types returned by the Contained Types function to the Resolve Atom function to ensure that a resolution of the contained atom is selected that can be inserted in the selected resolution by the accessor. In step 1008, the atom server calls the Replace Contained Atom function of the accessor to replace the contained atom with the resolution returned by the call to the Resolve Atom function in step 1007. After step 1008, the atom server continues at step 1005 to process the next contained atom.

In order to provide the sample draw application to a five year old user named Billy, the atom client submits an atom resolution request to the atom server for the drawing application atom by calling the Resolve Atom function of the atom server, then executes the returned resolution of the drawing application atom, as shown by the following atom client pseudocode:

```
drawing application = Resolve Atom (
    atom identifier = "drawing app.",
    context identifier = "Billy",
    supported resolution types = "program" )
execute (drawing application)
```

In response, the atom server identifies the first entry in the application atom table (FIG. 9A) having resolution type "program" as a resolution of the drawing application atom. Because this is the only resolution of the drawing application atom in any of the atom tables, the atom server selects it to return to the application client. The data for the selected resolution 901 (FIG. 9B) is a source program for the drawing application that may be executed via an interpreter by the atom client, or, alternatively, compiled and executed by the atom client. Programs and other code may preferably also be stored as resolutions in the atom table in compiled form for execution by the atom client. Further, class definitions defining programmatic objects may preferably be stored as resolutions in the atom table to be instantiated, populated, and invoked by the atom client.

The atom server uses the accessor 1202 (FIG. 12) for the program atom type to retrieve the first embedded atom in the data for the selected resolution. The retrieved embedded atom occurs on the last line of the data for the selected resolution, and has atom identifier "drawing tracker." The atom server then recursively calls the Resolve Atom function to resolve the embedded drawing tracker atom. The resolutions of the embedded drawing tracker atom in the application atom table 910 (FIG. 9A) each contain a definition of a Mouse Tracker subroutine called by the drawing application source program in the selected resolution of the drawing application atom. When the atom server evaluates the conditions for these resolutions of the drawing tracker atom in condition groups 932 and 337, it determines that: condition group 932 is not satisfied, since it includes the condition that the requested context has an occupation category value of "engineer" or a child thereof in the occupation category value hierarchy (e.g., "electrical engineer") and the category value table 640 (FIG. 6) does not contain any occupation category value for Billy's context; and condition group 337 is satisfied, since its condition that the requested context has an age group category value of "child" or a child thereof, and the category value table 640 contains age group category value "child" for Billy's context. The atom server therefore chooses the resolution with condition group 337 as acceptable. (On the other hand, when the atom server, in response to another atom resolution request, evaluates the conditions for these resolutions of the drawing tracker atom in condition groups 932 and 337 for a 30 year old user named Sue who is an electrical engineer, it determines that: condition group 932 is satisfied since its only condition, occupation category "is kind of" (is the same category value as or is a descendant in the category value hierarchy of the category value) electrical engineer, is satisfied because Sue has occupation category value "electrical engineer" which is the child of the occupation category "engineer;" and condition group 337 is not satisfied, since its condition that the requested context has an age group category value of "child" or child thereof is not satisfied because the age group category value for Sue is undefined, which is neither the "child" category value or a descendant thereof.) Further, because the resolution of the drawing tracker with a null condition group has no conditions, the atom server also chooses this resolution as acceptable. From these two chosen resolutions, the atom server preferably applies a rule favoring resolutions with the most satisfied conditions to select the resolution with condition group 337 as acceptable as the resolution best suited to the requested context. The selected resolution is of type ascii text and has contents 903 (FIG. 9B), which is a definition of the Mouse Tracker subroutine that implements the "feet" drag behavior for children.

This atom resolution contains an embedded atom whose atom identifier is "seasonal feet" and whose resolution is known to the Mouse Tracker subroutine definition to be an image. According to the selected drawing tracker resolution, the resolved seasonal feet atom is drawn under the dragged object by the Mouse Tracker subroutine to exhibit the feet drag behavior for children.

Both the application atom table 910 and the sponsor atom table 920 (FIG. 9A) contain two resolutions of the seasonal feet atom. The images represented by these resolutions of the seasonal feet atoms 911–914 are shown in FIG. 9C. Image 911 corresponds to a resolution in the application atom table having the condition that the season category value must equal summer, and shows a plain pair of sandals. Image 912 corresponds to a resolution in the application atom table having the condition that the season category value must equal winter, and shows a plain pair of ice skates. Image 913 corresponds to a resolution in the sponsor atom table having the condition that the season category value must equal summer, and shows a pair of sandals bearing a triangular logo used by a footwear company sponsoring Billy's use of the atom client. Image 914 corresponds to a resolution in the sponsor atom table having the condition that the season category value must equal winter, and shows a pair of ice skates bearing the sponsor's triangular logo. Because the season category value is summer, the conditions for the ice skate resolutions (season="winter") are not satisfied. The conditions for both of the sandal resolutions (season="summer"), however, are satisfied. The sandal resolution from each of the two atom tables are therefore chosen by the atom server.

In order to select between the two sandal resolutions, the atom server preferably uses a rule that favors resolutions from higher priority atom tables. The three atom tables shown in FIG. 9A are preferably arranged in a priority order so that resolutions in the user atom table are selected over resolutions in the other two tables, and resolutions in the sponsor atom table are selected over resolutions in the application atom table. As a result, resolutions that are added to the application atom table along with the resolution of the drawing application are always available to all users. For users with sponsors, the sponsor atom table contains resolutions that are used instead of the resolutions in the application atom table. Finally, if a user expressly requests his or her own resolution of some atom, this resolution is stored in the user table and used instead of application and sponsor resolutions. In this case, the atom server applies the rule to select the sandals with logo resolution. The atom server then calls the Replace Contained Atom accessor function to store the selected sandals with logo resolution of the seasonal feet atom in the selected resolution of drawing tracker atom, and to store the selected feet resolution of the drawing tracker atom in the selected resolution of the drawing application atom. The atom server then returns the copy to the atom client, which executes it to provide the feet dragger behavior by drawing feet shod in logoed sandals under the dragged object.

As discussed above, the atom server may resolve atoms to resolutions that are data artifacts, such as visual images. The atom server may differentially resolve atoms to different visual images, either by resolving an atom to one of several static visual image resolutions, or by resolving to a dynamic visual image resolution that itself contains references to other atoms that differentially resolve to different visual images. In this way, the atom server may be used to customize visual images for particular users.

Figure 13:
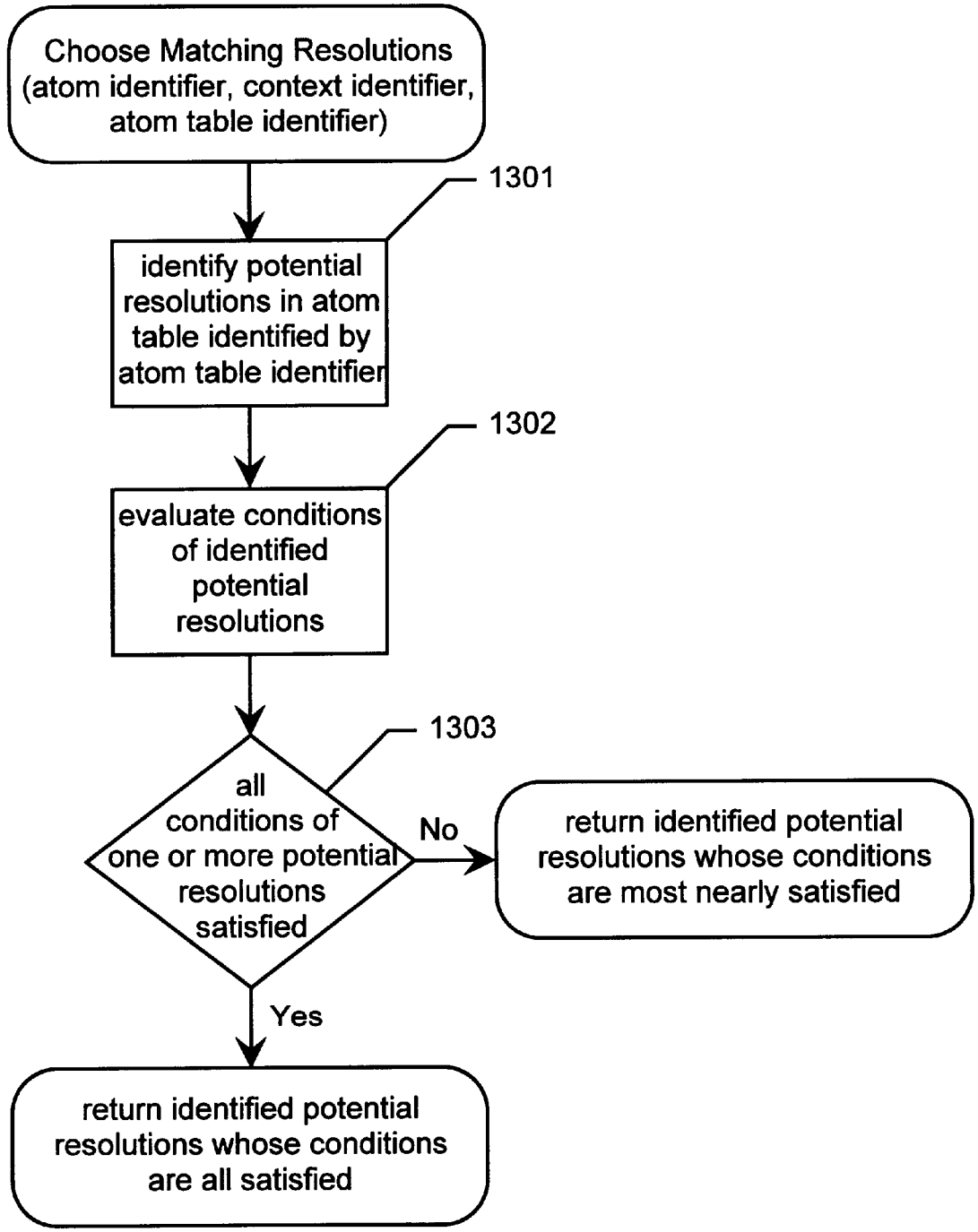
FIG. 13 is a flow diagram showing a Choose Matching Resolutions function used by the atom server to identify resolutions in a single atom table that match the requested atom identifier and context.

FIG. 13 is a flow diagram showing a Choose Matching Resolutions function used by the atom server to identify resolutions in a single atom table that match the requested atom identifier and context. The Choose Matching Resolutions function is called by the Resolve Atoms function, and takes as parameters the requested atom identifier, the requested context identifier, and the identifier of the atom table from which to choose matching resolutions. In step 1301, the atom server identifies any resolutions in the atom table having the requested atom identifier. In step 1302, the atom server evaluates the conditions of the identified resolutions. In step 1303, if all of the conditions of one or more of the identified resolutions are satisfied, then the atom server returns any identified resolutions whose conditions are completely satisfied, else the atom server returns the identified resolutions whose conditions are most nearly satisfied.

While the present invention has been shown and described with reference to preferred embodiments, it will be understood by those skilled in the art that various changes or modifications in form and detail may be made without departing from the scope of the invention. For example, an object-oriented database may be substituted for the relational database discussed above. Object-oriented databases generally provide facilities for managing lists of items and storing a list of items as a single field of a database record. Those skilled in the art will appreciate that this common feature of object-oriented databases would eliminate the need for the condition group tables discussed above, in that a list of conditions with the same condition group identifier could all be stored in the record the atom table record to which they pertain instead of in separate rows of a condition group table. Object-oriented databases also typically provide a sub-classing mechanism that can be used to manage the hierarchy of category values and expediently determine whether a first category value is a kind of a second category value, i.e., whether the first category value is the same as or is a descendant of the second category value. Those skilled in the art will appreciate that this feature of object-oriented database further facilitates the tailoring of the categories in a user context based on the value for a particular category, such as occupation, therefore facilitating the creation of new category values on-the-fly. Object-oriented databases further commonly provide facilities for managing data types more complex than text. Those skilled in the art will appreciate that this feature of object-oriented database would enable them to internally perform the complex data type reading and manipulation functions that are described above as being performed by special accessor routines. Finally, object-oriented databases generally further provide mechanisms for comparing a set of conditions en masse to a set of context data, which may be used to expedite the process of identifying resolutions whose conditions are satisfied by the context data.

I claim:

1. A method in a computer system for dynamically generating a custom application program tailored to an identified user, comprising:

storing a plurality of possible functions for the application program, each possible function having conditions that may be evaluated against user attributes of the identified user;

retrieving an application program having at least one function that is undetermined;

for each undetermined function of the application program, automatically selecting one of the possible functions by matching one or more user attributes of the identified user to one or more of the conditions associated with the possible function, such that the non-selected functions are excluded from the application program bring generated; and providing each selected function for execution as part of the application program.

2. The method of claim 1, wherein selecting one of the possible functions by matching one or more user attributes of the identified user to one or more of the conditions associated with the possible function, further comprises:

accessing a plurality of possible versions of the undetermined function, each possible version producing a different behavior in the application program and having one or more conditions that may be evaluated against user attributes for the identified user to determine whether the possible version is acceptable for the user;

for each possible version of the undetermined function, evaluating the conditions of the possible version to determine whether the possible version is acceptable for the user;

selecting a preferred one of the possible versions determined to be acceptable for the user using a preference rule; and adding only the selected version of the function to the application program so as to exclude the non-selected versions of the function from the application program.

3. The method of claim 2, wherein one of the possible versions of an undetermined function of the application program selected as preferred has an omitted portion, further comprising for the omitted portion of the selected possible version of the undetermined function of the application program:

accessing a plurality of possible versions of the omitted portion, each possible version having one or more conditions that may be evaluated against user attributes for the identified user to determine whether the possible version would be acceptable for the user;

for each possible version of the omitted portion, evaluating the conditions of the possible version to determine whether the possible version would be acceptable for the user;

selecting a preferred one of the possible versions of the omitted portion determined to be acceptable for the user using a preference rule; and adding only the selected version of the omitted portion of the selected possible undetermined function to the application program.

4. The method of claim 1 wherein a possible function of the application program has a further condition that may be evaluated against information not associated with a particular user to determine whether the possible function is acceptable for all users, and wherein the selection of one of the possible functions evaluates the further condition to determine whether the possible function is acceptable to all users.

5. The method of claim 1 wherein the storing of the plurality of possible functions for the otherwise incomplete application program and the selecting, retrieving, and providing of one or more of the possible functions to the otherwise incomplete application program occur on the same physical computer system on which the otherwise incomplete application is present.

6. The method of claim 1 wherein the storing of the plurality of possible functions for the otherwise incomplete application program and the selecting, and retrieving of one or more of the possible functions occurs on a first computer, and the providing of the functions occur over a network coupling the first computer to a second computer storing the application program to be completed.

7. A method in a computer system for developing a custom application program that can be tailored to user attributes in response to a request to execute the custom application program, comprising:

constructing an application program in which a portion of the application program is represented in the application program by a placeholder which may be replaced with different possible portions of the application program, each possible portion of the application program producing a different behavior in the application program;

designating two or more possible portions of the application program with which the placeholder may be replaced;

for each designated possible portion, defining conditions relating to user attributes that specify whether the behavior produced by the possible portion is acceptable for a user having particular user attributes; and specifying a rule for automatically selecting one of the acceptable possible portions as preferred, such that, in response to a request to execute the custom application program, the defined conditions may be evaluated to determine whether the behavior produced by each of the designated possible portions is acceptable for an identified user and the specified rule may be applied to automatically select one of the possible portions that produces acceptable behavior with which the placeholder in the constructed program may be replaced to tailor the developed custom application program for the identified user.

8. A computer program product for dynamically generating a custom application program tailored to an identified user, the computer program product comprising:

program code for storing a plurality of possible functions for the application program, each possible function having conditions that may be evaluated against user attributes of the identified user;

program code for retrieving at application program having at least one action that is undetermined;

program code for automatically selecting one of the possible functions for each undetermined function of the application according to one or more user attributes of the identified user, and one or more of the conditions associated with the possible function such that the non-selected functions are excluded from the application program being generated;

program code for providing each selected function for execution as part of the application program; and a computer readable medium on which the program codes are stored.

9. A computer program product for constructing a custom application program tailored to user attributes of a user in response to a request to execute the custom application program, the computer program product comprising:

an application program including a portion represented by a placeholder which is replaceable by different possible portions of the application program;

plural possible portions of the application program for replacing the placeholder, each possible portion of the application program producing a different behavior in the application program;

program code for defining at least one condition specifying whether the behavior produced by the possible portion is acceptable for a user having particular user attributes;

program code for specifying a rule for automatically selecting an acceptable possible portion as preferred, such that, in response to a request to execute the custom application program, program code evaluates the defined conditions to determine whether the behavior produced by each of the designated possible portions is acceptable for an identified user;

program code for automatically selecting one of the possible portions that produces acceptable behavior according to the conditions associated with the user attributes of the user to replace the placeholder in the constructed program; and a computer readable medium on which the program codes are stored.

10. A method of customizing an application program comprising:

storing on a server computer an incomplete application program;

storing on the server computer plurality of functions for completing the application program, each function producing a different behavior;

receiving at the server computer user attributes of a user of a client computer;

selecting automatically at least one acceptable function of the plurality of functions according to conditions associated with the acceptable functions and the user attributes;

combining the selected functions with the incomplete application to create a customized application, such that the non-selected functions are excluded from the customized application; and transmitting the customized application to the client computer.

11. A method of customizing an application program comprising:

storing on a client computer an incomplete application program;

storing on a server computer a plurality of functions for completing the application program, each function producing a different behavior;

receiving at the server computer user attributes of a user of the client computer;

selecting automatically at least one acceptable function of the plurality of functions according to conditions associate with the acceptable functions And the user attributes;

transmitting the selected functions to the client computer; and combining at the client computer the transmitted selected functions with the incomplete application to create a customized application, such that the non-selected functions are excluded from the customized application.

* * * * *

UNITED STATES PATENT AND TRADEMARK OFFICE
CERTIFICATE OF CORRECTION

PATENT NO. : 5,966,533

DATED : Oct. 12, 1999

INVENTOR(S) : Scott F. Moody

It is certified that error appears in the above-identified patent and that said Letters Patent is hereby corrected as shown below:

Column 14, line 32, delete "bring" and replace with --being--.

Column 16, line 3, delete "at" and replace with --an--.

Column 16, line 52, after the word "computer" please insert --a--.

Column 18, line 2, delete "And" and replace with --and--.

Signed and Sealed this

Twenty-ninth Day of August, 2000

Attest:

Q. TODD DICKINSON

*Attesting Officer*

*Director of Patents and Trademarks*